US008177623B2

(12) United States Patent
Okada

(10) Patent No.: US 8,177,623 B2
(45) **Date of Patent: *May 15, 2012**

(54) SLOT MACHINE AND CONTROL METHOD OF GAME

(75) Inventor: Kazuo Okada, Tokyo (JP)

(73) Assignee: Aruze Gaming America, Inc., Las Vegas, NV (US)

(*) Notice: Subject to any disclaimer, the term of this patent is extended or adjusted under 35 U.S.C. 154(b) by 251 days.

This patent is subject to a terminal disclaimer.

(21) Appl. No.: 11/876,060

(22) Filed: Oct. 22, 2007

(65) Prior Publication Data

US 2008/0161090 A1 Jul. 3, 2008

Related U.S. Application Data

(63) Continuation-in-part of application No. 10/262,106, filed on Oct. 2, 2002, now abandoned, and a continuation-in-part of application No. 10/263,820, filed on Oct. 4, 2002, now abandoned.

(60) Provisional application No. 60/907,673, filed on Apr. 13, 2007.

(30) Foreign Application Priority Data

Oct. 2, 2001 (JP) ................................ 2001-306773
Oct. 5, 2001 (JP) ................................ 2001-309825

(51) Int. Cl.
*A63F 9/24* (2006.01)
*A63F 13/00* (2006.01)

(52) U.S. Cl. ................ 463/20; 463/16; 463/25; 463/42; 273/138.1; 273/138.2; 273/143 R

(58) Field of Classification Search .................... 463/16, 463/20, 25, 29, 42; 273/138.1–2, 143 R
See application file for complete search history.

(56) References Cited

U.S. PATENT DOCUMENTS 4,283,709 A 8/1981 Lucero et al.
4,624,459 A 11/1986 Kaufman
(Continued)

FOREIGN PATENT DOCUMENTS

DE 3242890 5/1984
(Continued)

*Primary Examiner* — Dmitry Suhol
*Assistant Examiner* — Ryan Hsu
(74) *Attorney, Agent, or Firm* — Lexyoume IP Group, PLLC.

(57) ABSTRACT

A slot machine of the present invention comprises: a symbol display device capable of variably displaying a plurality of symbols; and a controller, the controller programmed to execute the processing of: (A) executing a game in which the plurality of symbols are variably displayed and then stop-displayed to the symbol display device after game media are BET in a number equal to or less than a previously set maximum number of BETs, and game media are paid out in a number according to the stop-displayed symbols or a combination thereof; (B) shifting a mode from a non-insurance mode to an insurance mode on condition that a predetermined number of game media is inserted; (C) counting the number of games played after shifting to the insurance mode, in the insurance mode; (D) paying out a predetermined number of game media when the number of games counted in the processing (C) reaches a specific number; and (E) clearing the number of games counted in the processing (C), when a game is played in which game media are paid out in a number equal to or more than a predetermined number before the number of games counted in the processing (C) reaches the specific number.

11 Claims, 38 Drawing Sheets

U.S. PATENT DOCUMENTS

| | | | | | |
|---|---|---|---|---|---|
| 4,669,731 | A * | 6/1987 | Clarke | 463/20 |
| 4,837,728 | A | 6/1989 | Barrie et al. | |
| 4,964,638 | A | 10/1990 | Ishida | |
| 5,178,390 | A | 1/1993 | Okada | |
| 5,280,909 | A * | 1/1994 | Tracy | 463/27 |
| 5,564,700 | A | 10/1996 | Celona | |
| 5,611,730 | A | 3/1997 | Weiss | |
| 5,639,088 | A | 6/1997 | Schneider et al. | |
| 5,667,439 | A * | 9/1997 | Okada | 463/20 |
| 5,695,402 | A | 12/1997 | Stupak | |
| 5,702,303 | A | 12/1997 | Takemoto et al. | |
| 5,770,533 | A | 6/1998 | Franchi | |
| 5,820,459 | A | 10/1998 | Acres et al. | |
| 5,836,817 | A | 11/1998 | Acres et al. | |
| 5,836,819 | A * | 11/1998 | Ugawa | 463/30 |
| 5,890,963 | A | 4/1999 | Yen | |
| 5,910,048 | A | 6/1999 | Feinberg | |
| 6,001,016 | A | 12/1999 | Walker et al. | |
| 6,003,013 | A | 12/1999 | Boushy et al. | |
| 6,089,980 | A | 7/2000 | Gauselmann | |
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 * | 8/2001 | Shuster | 463/20 |
| 6,273,820 | B1 | 8/2001 | Haste, III | |
| 6,319,125 | B1 * | 11/2001 | Acres | 463/25 |
| 6,575,832 | B1 * | 6/2003 | Manfredi et al. | 463/25 |
| 6,695,697 | B1 | 2/2004 | Okada | |
| 6,932,704 | B2 | 8/2005 | Walker et al. | |
| 6,932,707 | B2 | 8/2005 | Duhamel | |
| 7,980,944 | B2 * | 7/2011 | Okada | 463/20 |
| 2002/0077172 | A1 * | 6/2002 | Uchiyama et al. | 463/20 |
| 2003/0069073 | A1 | 4/2003 | Okada | |
| 2003/0100362 | A1 * | 5/2003 | Horniak et al. | 463/25 |

FOREIGN PATENT DOCUMENTS

| | | | |
|---|---|---|---|
| DE | 3712841 | | 11/1988 |
| DE | 4137010 | | 8/1992 |
| DE | 10049444 | | 11/2001 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| JP | 2719450 | | 11/1997 |
| WO | WO03/083795 | A1 | 10/2003 |
| WO | WO2004/095383 | A1 | 11/2004 |

* cited by examiner

Fig. 3

| | PAY TABLE | | | 1BET | 2BET | MAX(3)BET |
|---|---|---|---|---|---|---|
| *1* | *DOUBLE* | *DOUBLE* | *DOUBLE* | *800* | *1600* | *2400* |
| *2* | *DOUBLE* | *DOUBLE* | *3BAR* | *240* | *480* | *720* |
| *3* | *DOUBLE* | *3BAR* | *3BAR* | *120* | *240* | *360* |
| *4* | *3BAR* | *3BAR* | *3BAR* | *60* | *120* | *180* |
| *5* | *DOUBLE* | *DOUBLE* | *2BAR* | *120* | *240* | *360* |
| *6* | *DOUBLE* | *2BAR* | *2BAR* | *60* | *120* | *180* |
| 7 | 2BAR | 2BAR | 2BAR | 30 | 60 | 90 |
| *8* | *DOUBLE* | *DOUBLE* | *1BAR* | *60* | *120* | *180* |
| 9 | DOUBLE | 1BAR | 1BAR | 30 | 60 | 90 |
| 10 | 1BAR | 1BAR | 1BAR | 15 | 30 | 45 |
| 11 | DOUBLE | ANY BAR | ANY BAR | 10 | 20 | 30 |
| 12 | ANY BAR | ANY BAR | ANY BAR | 5 | 10 | 15 |
| *13* | *DOUBLE* | *DOUBLE* | *CHERRY* | *80* | *160* | *240* |
| 14 | DOUBLE | CHERRY | CHERRY | 40 | 80 | 120 |
| 15 | CHERRY | CHERRY | CHERRY | 20 | 40 | 60 |
| 16 | DOUBLE | CHERRY | ANY | 10 | 20 | 30 |
| 17 | CHERRY | CHERRY | ANY | 5 | 10 | 15 |
| 18 | CHERRY | ANY | ANY | 2 | 4 | 6 |
| 19 | GIFT BONUS | | | 44.138 | 44.138 | 44.138 |

Fig. 25

| Code No. | Index | Number of steps (※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※ The number of steps regarding index 1 as basis of reference

SLOT MACHINE AND CONTROL METHOD OF GAME

CROSS-REFERENCE TO RELATED APPLICATIONS

This application claims benefit of priority based on U.S. Provisional Patent Application No. 60/907,673 filed on Apr. 13, 2007. This application is also a continuation-in-part of co-pending U.S. patent application Ser. No. 10/262,106 filed on Oct. 2, 2002, and Ser. No. 10/263,820 filed on Oct. 4, 2002. The contents of this these applications are incorporated herein by reference in their entirety.

BACKGROUND OF THE INVENTION

1. Field of the Invention

The present invention relates to a slot machine and a control method of a game.

2. Discussion of the Background

Conventionally, examples of a slot machine are disclosed in: U.S. Pat. No. 5,820,459, U.S. Pat. No. 6,695,697, US 2003/0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP0631798-A, DE4137010-A1, GB 2326830-A, DE 3712841-A1, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO 03/083795-A, DE 3242890-A1, EP 0840264-A, DE 10049444-A1, WO 04/095383-A, EP 1544811-A, U.S. Pat. No. 5,890,963, EP 1477947-A, and EP 1351180-A. In a facility where a slot machine or the like is installed, a variety of game media such as coins or cash are inserted into the slot machine to play a game. Each slot machine is configured to provide an award according to a winning state (game result) occurring along with progression of games. Among those conventional gaming machines, as disclosed in U.S. Pat. No. 5,910,048 for example, there has been a slot machine in which a profit is returned to the player when loss of the game media reaches a predetermined amount.

It is an object of the present invention to provide a slot machine and a game control method thereof, which have the function of returning a profit and are capable of providing a player with great excitement even if a combination of bonus triggers is established when the loss of game media is reaching a certain value, thereby offering new entertainments.

The contents of U.S. Pat. No. 5,820,459, U.S. Pat. No. 6,695,697, US 2003/0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP 0631798-A, DE 4137010-A1, GB 2326830-A, DE 3712841-A1, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO03/083795-A, DE3242890-A1, EP0840264-A, DE 10049444-A1, WO 04/095383-A, EP 1544811-A, U.S. Pat. No. 5,890,963, EP 1477947-A, and EP 1351180-A are incorporated herein by reference in their entirety.

SUMMARY OF THE INVENTION

The present invention provides a slot machine having the following configuration.

That is, the slot machine comprises:

a symbol display device capable of rearranging a plurality of symbols;

an image display device capable of displaying an image; and a controller.

The controller is programmed to execute the processing of:

(A) executing a game in which the plurality of symbols are rearranged by the symbol display device after game media are BET in a number equal to or less than a previously set maximum number of BETs, and game media are paid out in a number according to the rearranged symbols or a combination thereof;

(B) shifting a mode from an on-insurance mode to an insurance mode on condition that a predetermined number of game media is inserted;

(C) counting the number of games played after shifting to the insurance mode, in the insurance mode;

(D) paying out a predetermined number of game media when the number of games counted in the processing (C) reaches a specific number;

(E) determining whether or not a predetermined bonus has been established during games which are executed after the number of games counted in the process (C) reaches a notice set value which is smaller than the predetermined number by a predetermined value until it reaches the predetermined number; and (F) performing payout of game media based on the combination of bonus triggers at the timing of payout of game media in the processing (D), when the bonus trigger is determined to be established in the processing (E).

Desirably, the above-mentioned slot machine further comprises the following.

That is, the controller is further programmed to execute the processing of:

(G) displaying a normal effect image to the image display device; and (H) displaying, when the number of games counted in the processing (C) reaches a notice set value which is smaller than the predetermined number by the predetermined value, a specific effect image, instead of the normal effect image, to the image display device in subsequent games.

Desirably, the above-mentioned slot machine further comprises the following.

That is, the controller is further programmed to execute the processing of (I): clearing the number of games counted in the processing (C), when the bonus trigger is established before the number of games counted in the processing (C) reaches the notice set value.

Desirably, the above-mentioned slot machine further comprises the following.

That is, the controller is further programmed to pay out a smaller number of game media as the number of the game, in which the bonus is established, approaches to the specific number in the processing (D).

Desirably, the above-mentioned slot machine further comprises the following.

That is, the controller is further programmed to execute the processing of (J): displaying to the image display device information indicating that the game media based on the bonus trigger are paid out when the number of games reaches the predetermined number, when the bonus trigger is determined to be established in the processing (E).

The present invention further provides a game control method having the following configuration.

That is, the game control method comprises the steps of:

(A) executing a game in which a plurality of symbols are rearranged by the symbol display device capable of rearranging the plurality of symbols after game media are BET in a number equal to or less than a previously set maximum number of BETs, and game media are paid out in a number according to the rearranged symbols or a combination thereof;

(B) shifting a mode from an on-insurance mode to an insurance mode on condition that a predetermined number of game media is inserted;

(C) counting the number of games played after shifting to the insurance mode, in the insurance mode;

(D) paying out a predetermined number of game media when the number of games counted in the step (C) reaches a specific number;

(E) determining whether or not a predetermined bonus has been established during games which are executed after the number of games counted in the process (C) reaches a notice set value which is smaller than the predetermined number by a predetermined value until it reaches the predetermined number; and (F) performing payout of game media based on the combination of bonus triggers at the timing of payout of game media in the step (D), when the bonus trigger is determined to be established in the step (E).

BRIEF DESCRIPTIONS OF DRAWINGS

FIG. 3 is a view for explaining a payout table in the present embodiment.

FIG. 25 is a schematic view showing a correspondence table of the number of steps and code No.

DESCRIPTION OF THE EMBODIMENTS

Figure 1:
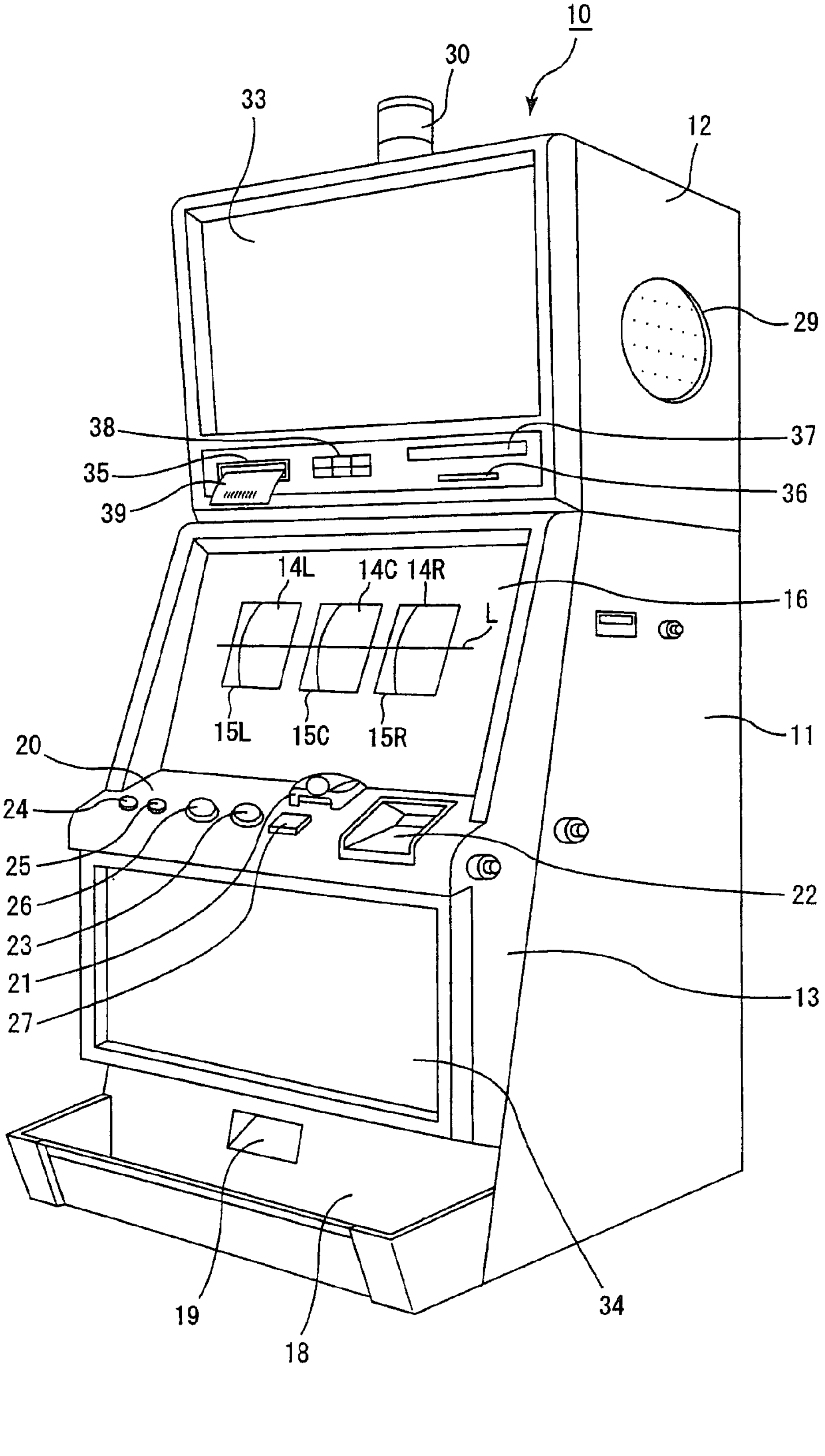
FIG. 1 is a perspective view schematically showing a slot machine according to one embodiment of the present invention.

FIG. 1 is a perspective view schematically showing a slot machine according to one embodiment of the present invention.

In a slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11. Inside the cabinet 11, three reels 14 (14L, 14C, 14R) are rotatably provided. On the peripheral face of each of the reels 14, a symbol sequence consisting of 22 figures (hereinafter also referred to as symbols) is drawn.

The reels 14 correspond to the symbol display device of the present invention.

A lower image display panel 16 is provided at the front of the respective reels 14 on the main door 13. The lower image display panel 16 is provided with a transparent liquid crystal panel to which a variety of information concerning a game, an effect image and the like are displayed during the game.

The lower image display panel 16 corresponds to the image display device of the present invention.

On the lower image display panel 16, three display windows 15 (15L, 15C, 15R) are formed in which their back faces a revisible, and three symbols drawn on the peripheral face of each of the reels 14 are respectively displayed via each of the display windows 15. On the lower image display panel 16, one winning line L horizontally crossing over the three display windows 15 is formed. The winning line L is for determining a combination of symbols. When the combination of symbols that are rearranged along the winning line L is a predetermined combination, coins are paid out in a number according to the combination and the number of inserted coins (the number of BETs).

It is to be noted that, in the present invention, it may be possible to provide a configuration such that, for example, there are formed a plurality of winning lines L crossing horizontally or diagonally over the three display windows 15, and the winning lines L in a number according to the number of inserted coins are verified, and when a combination of symbols rearranged along the verified winning line L is a predetermined combination, coins are paid out in a number according to the combination.

Further, when a specific symbol (so-called scatter symbol) is rearranged to the display window, coins may be paid out in a number according to the number of the scatter symbols regardless of the combination of symbols.

Moreover, although not shown, a touch panel 69 is provided at the front face of the lower image display panel 16. The player can operate the touch panel 69 to input a variety of commands.

Below the lower image display panel 16, there are provided a control panel 20 comprised of a plurality of buttons 23 to 27 with each of which a command according to game progress is inputted by the player, a coin receiving slot 21 through which a coin is accepted into the cabinet 11, and a bill validator 22.

The control panel 20 is provided with a spin button 23, a change button 24, a CASHOUT button 25, a 1-BET button 26 and a maximum BET button 27. The spin button 23 is used for inputting a command to start rotation of the reels 14. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (three coins in the present embodiment) out of credited coins. In addition, the maximum number of BETs may be configured so as to be set by the operator, staff or the like of the casino.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely below the control panel 20, there is provided a belly glass 34 on which a character or the like of the slot machine 10 is drawn.

An upper image display panel 33 is provided at the front face of the top box 12. The upper image display panel 33 is provided with a liquid crystal panel to display, for example, an effect image, an image representing introduction of contents of a game, and explanation of a rule of the game.

Also, a speaker 29 is provided on the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 is comprised of a fluorescent display and the like, and displays, for example, data read by the card reader 36 or data inputted by the player via the key pad 38. The key pad 38 is used for inputting a command and data concerning issuing of a ticket, and the like.

Figure 2:
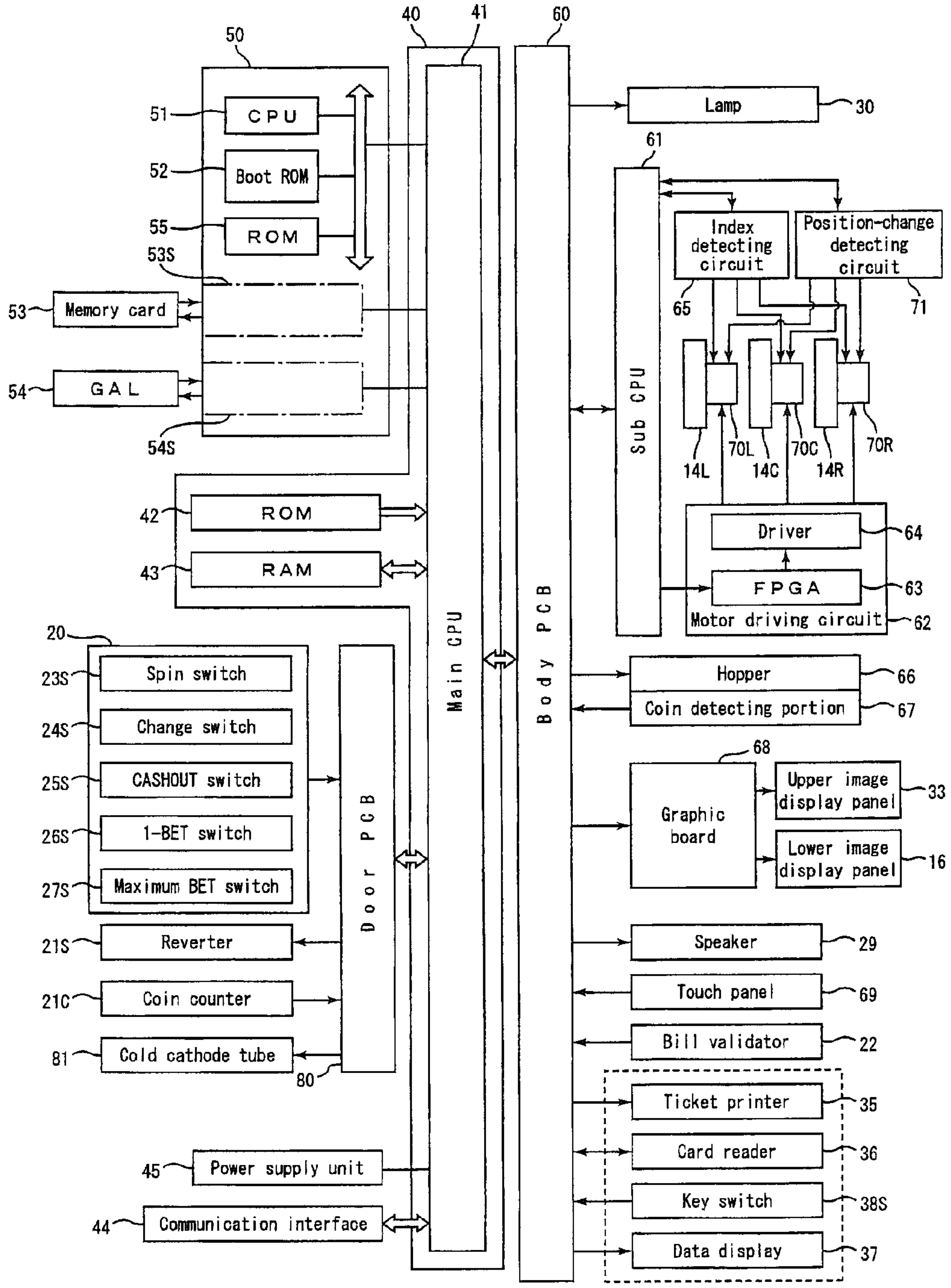
FIG. 2 is a block diagram showing the internal configuration of the slot machine shown in FIG. 1.

FIG. 2 is a block diagram showing the internal configuration of the slot machine shown in FIG. 1.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 is comprised of a nonvolatile memory such as CompactFlash (registered trade mark), and stores a game program and a game system program. The game program includes a to-be-stopped symbol determination program. The to-be-stopped symbol determination program is a program for determining a symbol (code No. corresponding to the symbol) on each of the reels 14 to be rearranged along the winning line L. The to-be-stopped symbol determination program includes symbol weighing data respectively corresponding to a plurality of types of payout ratios (e.g. 80%, 84%, 88%). The symbol weighing data is data showing the corresponding relation between code No. of each symbol (see FIG. 25) and one or a plurality of random numbers belonging to a predetermined numerical range (0 to 255), for each of the three reels 14. The payout ratio is set based on payout ratio setting data which is outputted from a GAL 54, and a symbol to be rearranged is determined based on the symbol weighing data corresponding to the payout ratio.

Further, the card slot 53S is configured so as to allow the memory card 53 to be inserted thereinto or ejected therefrom, and is connected to the mother board 40 by an IDE bus. Therefore, the memory card 53 can be ejected from the card slot 53S, and then another game program and another game system program are written into the memory card 53, and the memory card 53 can be inserted into the card slot 53S, to change the type and contents of a game played on the slot machine 10. Further, the memory card 53 storing one game program and one game system program can be exchanged with the memory card 53 storing another game program and another game system program, to change the type and contents of a game played on the slot machine 10.

The game program includes a program according to progression of the game. Further, the game program includes image data and sound data to be outputted during the game, image data and sound data for notifying that the mode has been shifted to the insurance mode, image data and sound data for notifying that the mode has shifted to the non-insurance mode, and the like.

The GAL 54 is a type of a PLD having an OR fixed type array structure. The GAL 54 is provided with a plurality of input ports and output ports. When predetermined data is inputted into the input port, the GAL 54 outputs, from the output port, data corresponding to the inputted data. The data outputted from the output port is the above-mentioned payout ratio setting data.

Further, the IC socket 54S is configured such that the GAL 54 can be mounted thereonto and removed therefrom, and the IC socket 54S is connected to the mother board 40 through the PCI bus. Therefore, the GAL 54 can be removed from the IC socket 54S, and then a program to be stored into the GAL 54 is rewritten, and the GAL 54 is then mounted onto the IC socket 54S, to change the payout ratio setting data outputted from the GAL 54. Further, the GAL 54 can be exchanged with another GAL 54 to change the payout ratio setting data.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50. In the ROM 55, country identification information and an authentication program are stored. In the boot ROM 52, an auxiliary authentication program and a program (boot code) to be used by the CPU 51 for activating the auxiliary authentication program, and the like are stored.

The authentication program is a program (falsification check program) for authenticating a game program and a game system program. The authentication program is written along a procedure (authentication procedure) for checking and proving that a game program and a game system program to be subject to authentication loading processing have not been falsified, namely authenticating the game program and the game system program. The auxiliary authentication program is a program for authenticating the above-mentioned authentication program. The auxiliary authentication program is written along a procedure (authentication procedure) for proving that an authentication program to be subject to the authentication processing has not been falsified, namely authenticating the authentication program.

The mother board 40 is configured using a commercially available general-purpose mother board (a print wiring board on which fundamental components of a personal computer are mounted), and comprises a main CPU 41, a ROM (Read Only Memory) 42, a RAM (Random Access Memory) 43, and a communication interface 44. The main CPU 41, the ROM 42 and the RAM 43 mounted on the mother board 40 constitute the controller of the present invention.

The ROM 42 is comprised of a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program and the game system stored in the memory card 53 via the gaming board 50. It should be noted that, in the present invention, the ROM 42 may or may not be data rewritable one.

The RAM 43 stores data and a program to be used at the time of operation of the main CPU 41. Further, the RAM 43 is capable of storing an authentication program to be read via the gaming board 50, a game program and a game system program.

Further, the RAM 43 is provided with a storage area for an insurance mode flag. The insurance mode flag is a flag for indicating whether the mode is the insurance mode or the non-insurance mode. The storage area for the insurance mode flag is, for example, composed of a storage area of a predetermined number of bits, and the insurance mode flag is turned "ON" or "OFF" according to the stored contents of the storage area. The insurance mode flag being "ON" indicates the insurance mode, and the insurance mode flag being "OFF" indicates the non-insurance mode.

Further, the RAM 43 is provided with a storage area for data showing the number-of-games C.

Moreover, the RAM 43 stores data of the number of credits, the number of coin-ins and coin-outs in one game, and the like. The communication interface 44 serves to communicate with an external device such as a server of the casino, via the communication line 101.

Moreover, the mother board 40 is connected with a later-described body PCB (Printed Circuit Board) 60 and a door PCB 80 through respective USBs. Further, the mother board 40 is connected with a power supply unit 45. When power is supplied from the power supply unit 45 to the mother board 40, the main CPU 41 of the mother board 40 is activated concurrently with supply of power to the gaming board 50 via the PCI bus to activate the CPU 51.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program and the game system program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, a sub CPU 61, a hopper 66, a coin detecting portion 67, a graphic board 68, a speaker 29, a touch panel 69, a bill validator 22, a ticket printer 35, a card reader 36, a key switch 38S and a data display 37. The lamp 30 is lighted in a predetermined pattern based on a control signal outputted from the main CPU 41. In more specific, the lamp 30 blinks during a display of a countdown which will be described below by using FIGS. 4 to 14, and reduces the blinking frequency as the countdown approaches zero. Here, it is also possible that the lamp 30 comprises a revolving light, and the blinking frequency is increased.

The sub CPU 61 serves to control rotation and stop of the reels 14 (14L, 14C, 14R). A motor driving circuit 62 having an FPGA (Field Programmable Gate Array) 63 and a driver 64 are connected to the sub CPU 61. The FPGA 63 is an electronic circuit such as a programmable LSI, and functions as a control circuit of a stepping motor 70. The driver 64 functions as an amplification circuit of a pulse to be inputted into the stepping motors 70. The stepping motors 70 (70L, 70C, 70R) for rotating the respective reels 14 are connected to the motor driving circuit 62. The stepping motor 70 is a one-two phase excitation stepping motor.

In the present invention, the excitation method of the stepping motor is not particularly limited, and for example, a two phase excitation method, one phase excitation method or the like may be adopted. Further, a DC motor may be adopted in place of the stepping motor. In the case of adopting the DC motor, a deviation counter, a D/A converter, and a servo amplifier are sequentially connected to the sub CPU 61, and the DC motor is connected to the servo amplifier. Further, a rotational position of the DC motor is detected by a rotary encoder, and a current rotational position of the DC motor is supplied as data from the rotary encoder to the deviation counter.

Further, an index detecting circuit 65 and a position-change detecting circuit 71 are connected to the sub CPU 61. The index detecting circuit 65 detects the position (later-described index) of the reels 14 during rotation, and is further capable of detecting a loss of synchronism of the reels 14. It should be noted that the control of rotation and stoppage of reels 14 will be described later in detail using the figures.

The position-change detecting circuit 71 detects the change of the stop positions of the reel 14, after the stop of the rotation of the reels 14. For example, the position-change detecting circuit 71 detects the change of the stop positions of the reels 14, in a case such that a player forcibly changes the stop positions of reels 14 to create a combination of symbols in a winning state, even though the actual combination of symbols is not in the winning state, or in some other cases. The position-change detecting circuit 71 is configured, for example, to detect fins (not shown) mounted to the inner sides of the reels 14 at predetermined intervals so as to detect the change of the stop positions of the reels 14.

The hopper 66 is installed inside the cabinet 11, and pays out a predetermined number of coins based on the control signal outputted from the main CPU 41, from the coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. The number of credits stored in the RAM 43 is displayed to the number-of-credits display portion 31 of the lower image display panel 16. Further, the number of payouts of coins is displayed to the number-of-payouts display portion 32 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode formed by encoding data such as the number of credits stored in the RAM 43, a date, and an identification number of the slot machine 10, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38 based on the control signal outputted from the main CPU 41.

The door PCB 80 is connected with a control panel 20, a reverter 21S, a coin counter 21C, and a cold cathode tube 81. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and the maximum BET switch 27S corresponding to the maximum BET button 27. The respective switches 23S to 27S output input signals to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lit up based on the control signal outputted from the main CPU 41.

FIG. 3 is a view for explaining a payout table in the present embodiment.

“DOUBLE”, “3BAR”, “2BAR”, “1BAR”, and “CHERRY” in the payout table represent types of symbols drawn on the reels 14. It is to be noted that, other than the above-mentioned symbols, a bonus trigger, which is a symbol corresponding to “GIFT BONUS”, and other symbols are also drawn on the reels 14. In the payout table, “ANY BAR” represents the “3BAR”, “2BAR” or “1BAR”, and “ANY” represents an arbitrary symbol.

Combinations shown in the payout table represent winning combinations, and the number of coin-outs is set for each of the winning combinations, according to the numbers of BETs.

When a combination of symbols on each of the reels 14 which are rearranged is the combination of “GIFT BONUS” bonus triggers, a predetermined number of coins is paid out as a jackpot. It is to be noted that a numeric value corresponding to “GIFT BONUS” in the payout table indicates an expectation value of the number of coin-outs, and is constant regardless of the number of BETs. Therefore, a setting is made such that the probability for establishing “GIFT BONUS” is high and the number of coin-outs is small in the case of 1BET whereas the probability for establishing “GIFT BONUS” is low and the number of coin-outs is large in the case of the MAXBET. It should be noted that this probability setting is made by using symbol weighing data.

Further, four types of jackpots “GRAND”, “MAJOR”, “MINOR” and “MINI” are provided in decreasing order of the number of coin-outs. The larger the number of coin-outs, the lower the jackpot occurrence ratio is set, and which jackpot is to be established is determined randomly using a random number. It should be noted that the expectation value of the number of coin-outs according to each jackpot is constant.

Here, each of the jackpots is set to payout 180 or more coins.

When a game is started by pressing of the spin button 23 after pressing of a 1-BET button 26 or a maximum BET button 27, the sequence of symbols drawn on each of the reels 14 is scroll-displayed downwardly in the display windows 15 with rotation of the reels 14, and after the lapse of a predetermined period of time, the sequence of symbols drawn on each of the reels 14 is rearranged in the display windows 15 with the stop of rotation of the reels 14. Further, a variety of winning combinations are previously set based on the respective combinations of symbols, and when the combination of symbols corresponding to the winning combination stops along the winning line L, the number of coin-outs according to the winning combination is added to credits owned by the player. When the combination of "GIFT BONUS" bonus triggers is established, a predetermined number of coin-outs is added to the credits owned by the player.

It should be noted that, in the present embodiment, there is described the case of paying out coins according to the jackpot when the combination of bonus triggers is established. However, the gaming state generated in establishment of the combination of bonus triggers is not particularly limited in the present invention. Examples of the gaming state may include a free game, a second game, and a mystery bonus. Further, when the combination of bonus triggers is established, the ticket 39 with a barcode may be issued with predetermined information printed thereon.

Combinations of symbols in italic in the payout table are combinations of which the number of coin-outs to be conducted is equal to or more than 180 when established in a game played with a MAXBET.

In the game played with a MAXBET in the insurance mode, when any one of those combinations of symbols is established, the mode is shifted from the insurance mode to the non-insurance mode.

Here, insurance in the slot machine 10 is described.

As for the insurance, the slot machine 10 has two modes: the insurance mode "RESCUE PAY ON"; and the non-insurance mode "RESCUE PAY OFF".

The non-insurance mode is set immediately after the power is turned on in the slot machine 10, and the mode is then shifted to the insurance mode by inserting a predetermined number of game media.

In the insurance mode, the number of games played after shifting to the insurance mode is counted.

When the number of games counted in the insurance mode reaches 1000, 360 coins are paid out (RESCUE PAY).

However, in the game played with a MAXBET in the insurance mode, when there is established a combination of which the number of coin-outs is equal to or more than 180, the number of games counted is cleared and the mode is shifted from the insurance mode to the non-insurance mode, as described above.

Next, the flow [P01] to [P20] of a game played on the slot machine 10 is described by using FIGS. 4 to 14.

FIGS. 4 to 14 are views showing images displayed to the upper image display panel 33 and the lower image display panel 16 provided in the slot machine 10.

In the figures, a numeral 15 (15L, 15C, 15R) denotes a display window. A numeral 31 denotes a number-of-credits display portion. A numeral 32 denotes a number-of-payouts display portion. A symbol L denotes a winning line.

[P01]

Figure 4A:
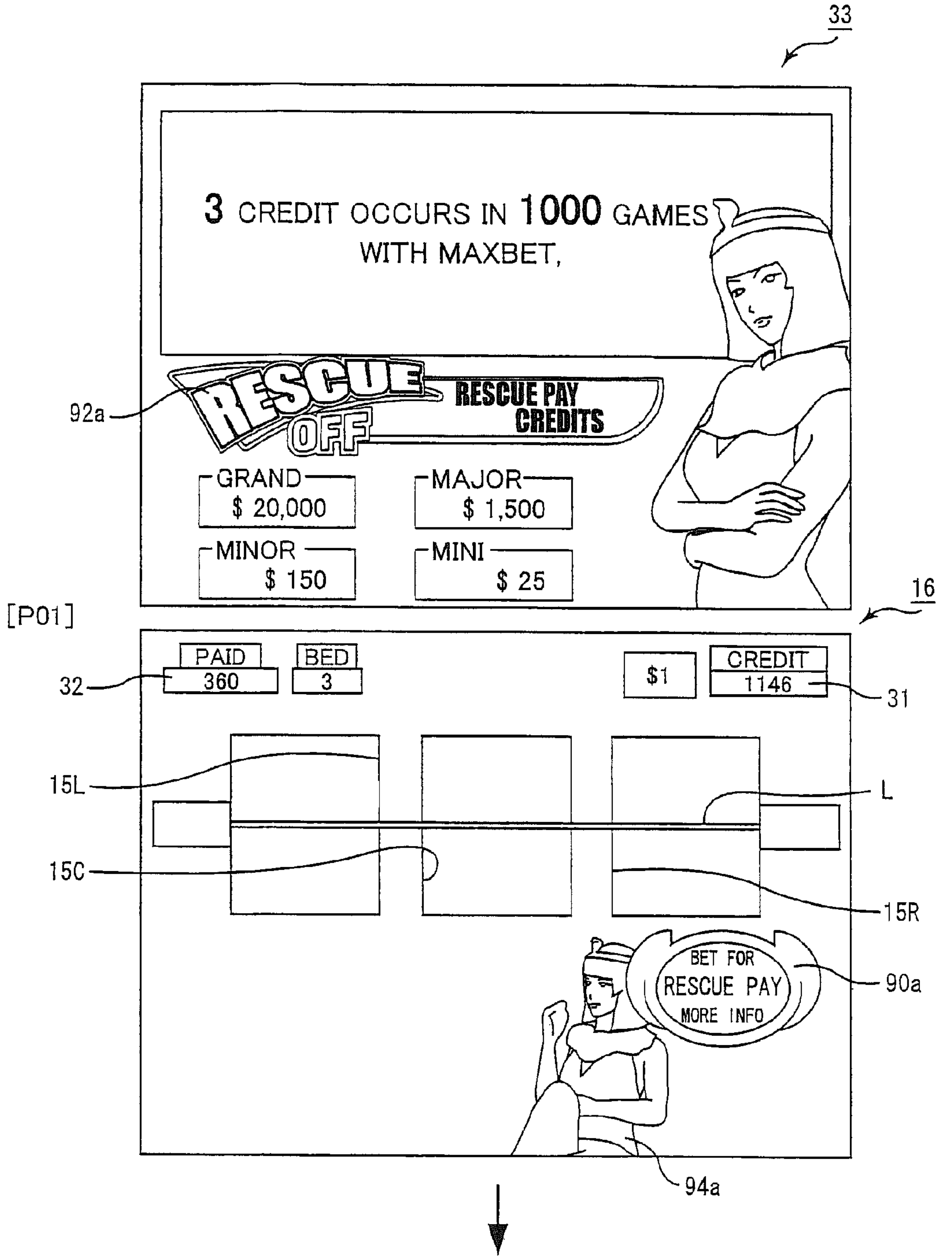
FIG. 4 is a view showing exemplary images displayed to the slot machine shown in FIG. 1.
Figure 4B:
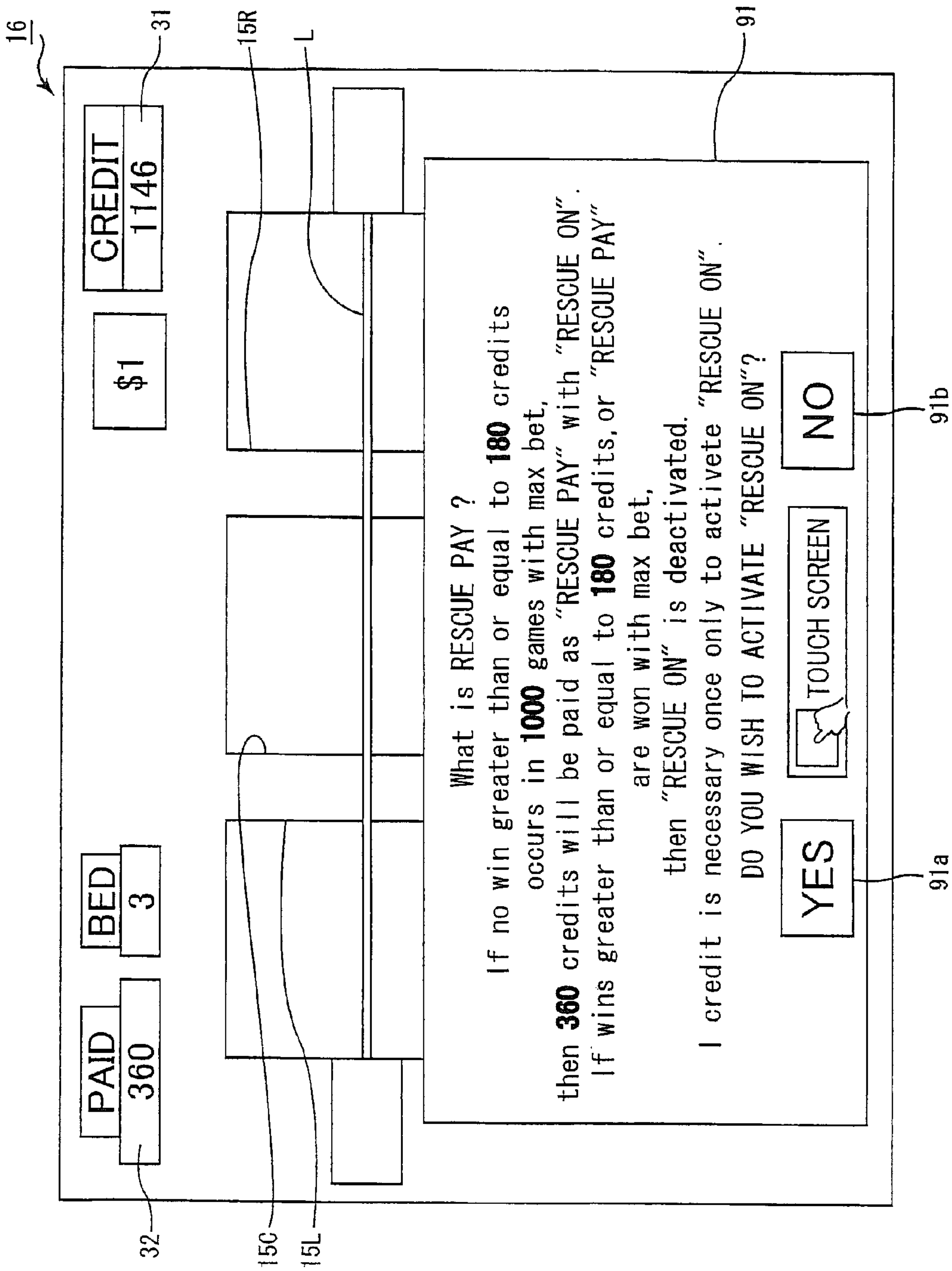

In the non-insurance mode, as shown in FIG. 4, an image 92*a* showing "RESCUE OFF" is displayed to the upper image display panel 33. The image 92*a* is an image showing that the current gaming state is the non-insurance mode.

Further, a normal effect image 94*a* is displayed to the lower image display panel 16.

Moreover, a button type image 90*a* showing "BET FOR RESCUE PAY MORE INFO" is displayed to the lower right portion of the lower image display panel 16. The image 90*a* is an image to request an input of a command to output information concerning the insurance mode. The player can input the command to output information concerning the insurance mode by touching a predetermined place of the touch panel 69 corresponding to the display area of the button type image 90*a*.

[P02]

When the above-mentioned command is inputted, an image 91 showing information concerning the insurance mode is displayed to the lower image display panel 16.

The image 91 includes information concerning the insurance mode as follows:

(I) the number of games to reach for paying out a predetermined number of coins, namely, a specific number (1000);

(II) the number (360) of coin-outs when the number of games reaches the specific number;

(III) clearing the number of games when a game with the MAXBET placed thereon and the number of coin-outs being equal to or more than 180 is played before the number of games reaches the specific number, namely, a number-of-games clearing condition;

(IV) shifting the mode from the insurance mode to the non-insurance mode when the game with the MAXBET placed thereon and the number of coin-outs being equal to or more than 180 is played before the number of games reaches the specific number, namely, an insurance canceling condition;

(V) counting the number of games with the MAXBET placed thereon, namely games to be counted; and (VI) the number (1) of credits necessary for shifting the mode from the non-insurance mode to the insurance mode.

Further, the image 91 includes information to make a request for an option as to whether or not to shift the mode from the non-insurance mode to the insurance mode, a button type image "YES" 91*a*, and a button type image "NO" 91*b*.

When a predetermined area of the touch panel 69 corresponding to the button type image "NO" 91*b* is touched by the player, an image shown in [P01] is displayed to the lower image display panel 16. On the other hand, when a predetermined area of the touch panel 69 corresponding to the button type image "YES" 91*a* is touched by the player, the mode is shifted from the non-insurance mode to the insurance mode.

[P03]

Figure 5A:
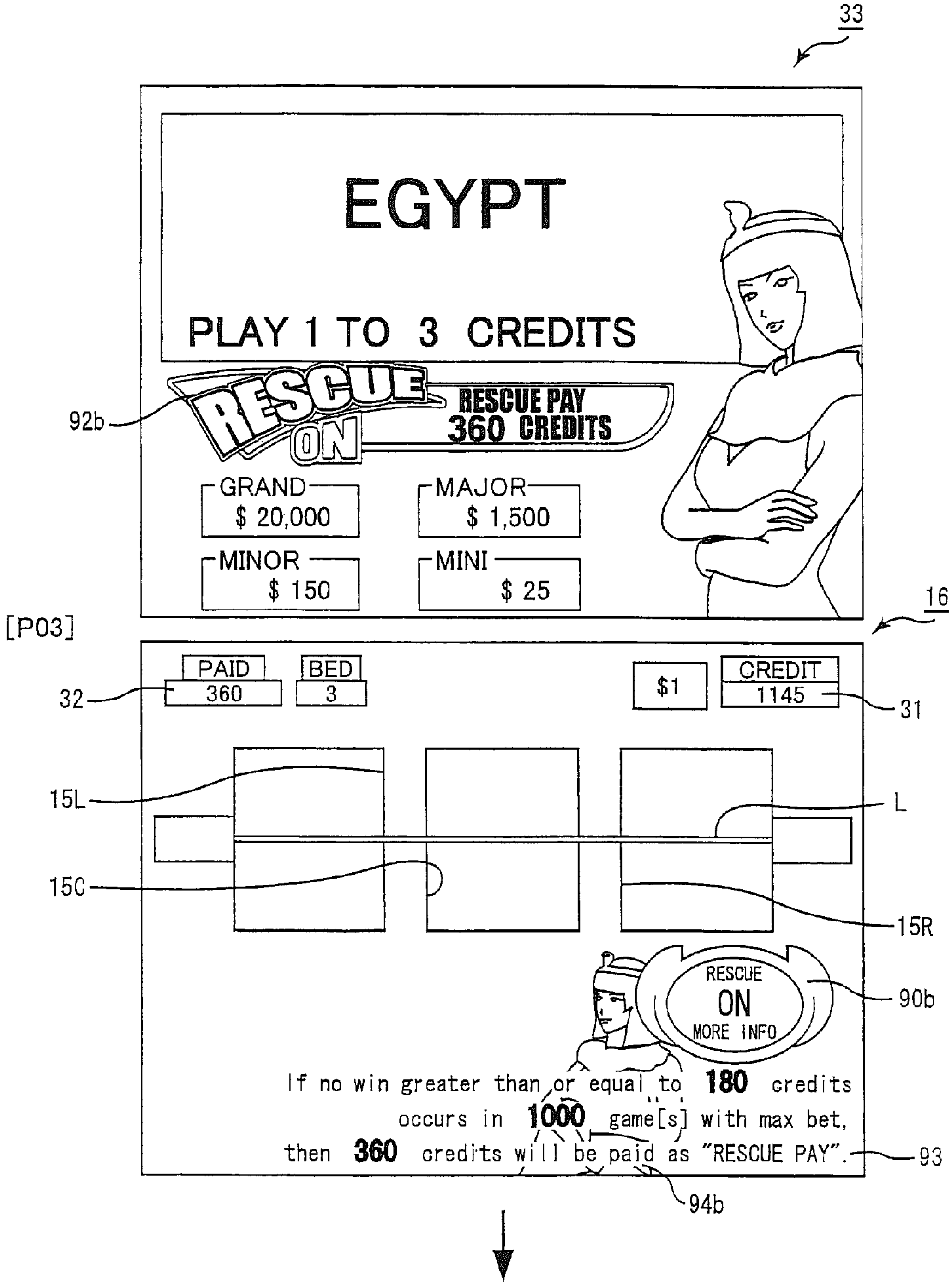
FIG. 5 is another view showing exemplary images displayed to the slot machine shown in FIG. 1.
Figure 5B:
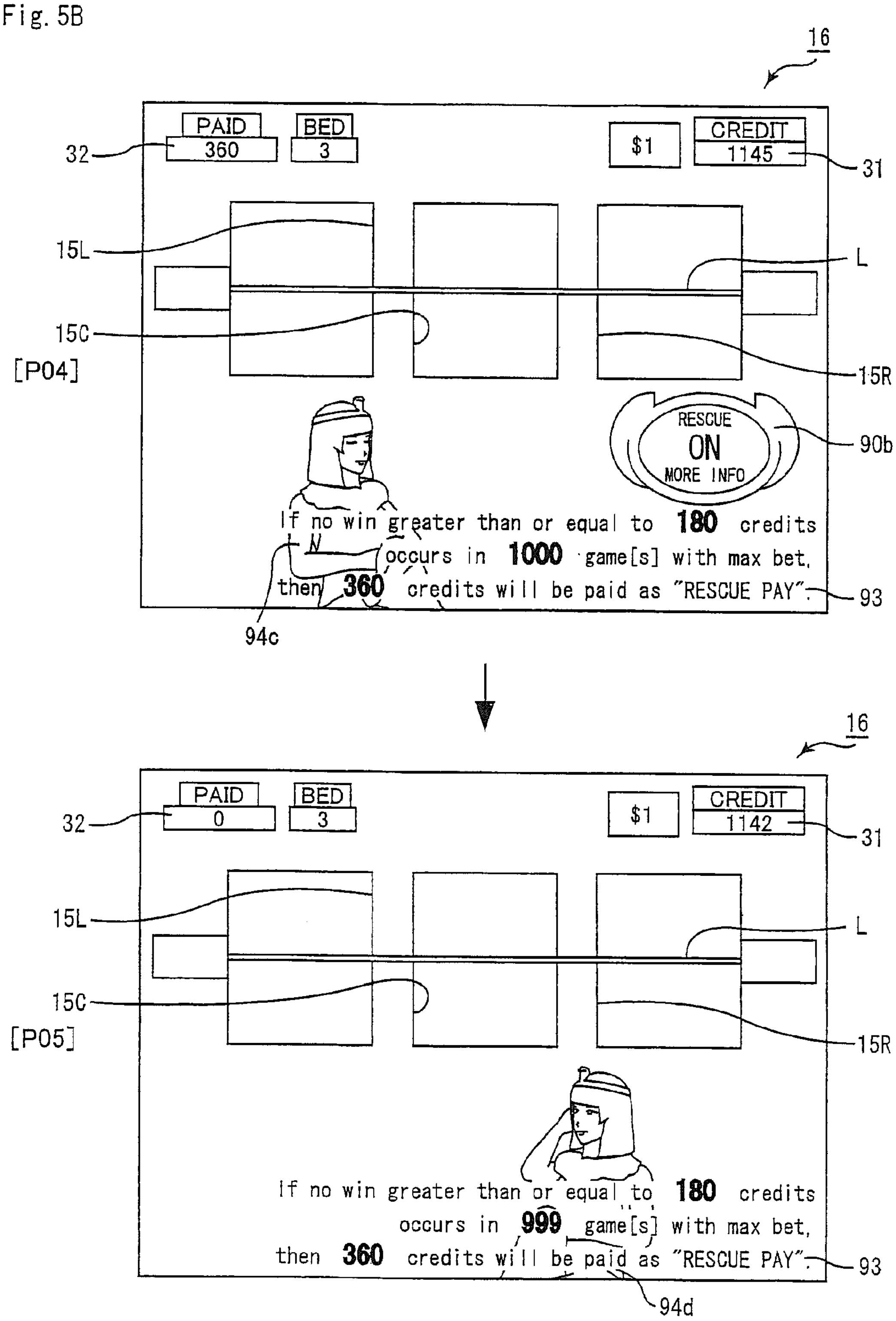

When the mode is shifted to the insurance mode, as shown in FIG. 5, an image 92*b* showing "RESCUE ON" is displayed to the upper image display panel 33. The image 92*b* is an image showing that the current gaming state is the insurance mode.

Further, a normal effect image 94*b* is displayed to the lower image display panel 16. While the normal effect image 94*b* in the insurance mode differs from a normal effect image 94*a* in the non-insurance mode, these are selected randomly by using random numbers, not based on whether the mode is the insurance mode or the non-insurance mode.

Further, a button type image 90*b* showing "RESCUE ON MORE INFORMATION" is displayed to the lower right portion of the lower image display panel 16. The button type image 90*b* is an image for showing that the current gaming state is the insurance mode and also for inputting a command to output information concerning the insurance mode.

When a predetermined place of the touch panel 69 corresponding to the display area of the button type image 90*b* is touched by the player, an image shown in [P02] is displayed to the lower image display panel 16.

Further, an image 93 is displayed below the button type image 90*b*, which shows that 360 coins are to be paid out when the number of games with the MAXBET (games to be counted) reaches a specific number.

When the game is started in the insurance mode, in a first game in the insurance mode, a normal effect image 94*c* is displayed to the lower image display panel 16, and the button type image 90*b* and the image 93 are continuously displayed.

The image 93 shows that 360 coins are to be paid out when the games to be counted are played 1000 times from now on.

[P05]

In a second game in the insurance mode, a normal effect image 94*d* is displayed and the image 93 is continuously displayed. The image 93 shows that 360 coins are to be paid out when the games to be counted are played 999 times from now on.

As thus described, in the slot machine 10, the image 93 is displayed to the lower image display panel 16, the image 93 showing the number of games to be played from the time point of starting the game in the insurance mode until the number of games to be counted reaches a specific number. Subsequently, the number of games left to be played is counted down on the image 93 so long as the above-mentioned number-of-games clearing condition or insurance canceling condition is not established. It is to be noted that as thus described, the normal effect image 94 is displayed in the insurance mode until the number of games reaches 990 (notice set value).

Figure 6A:
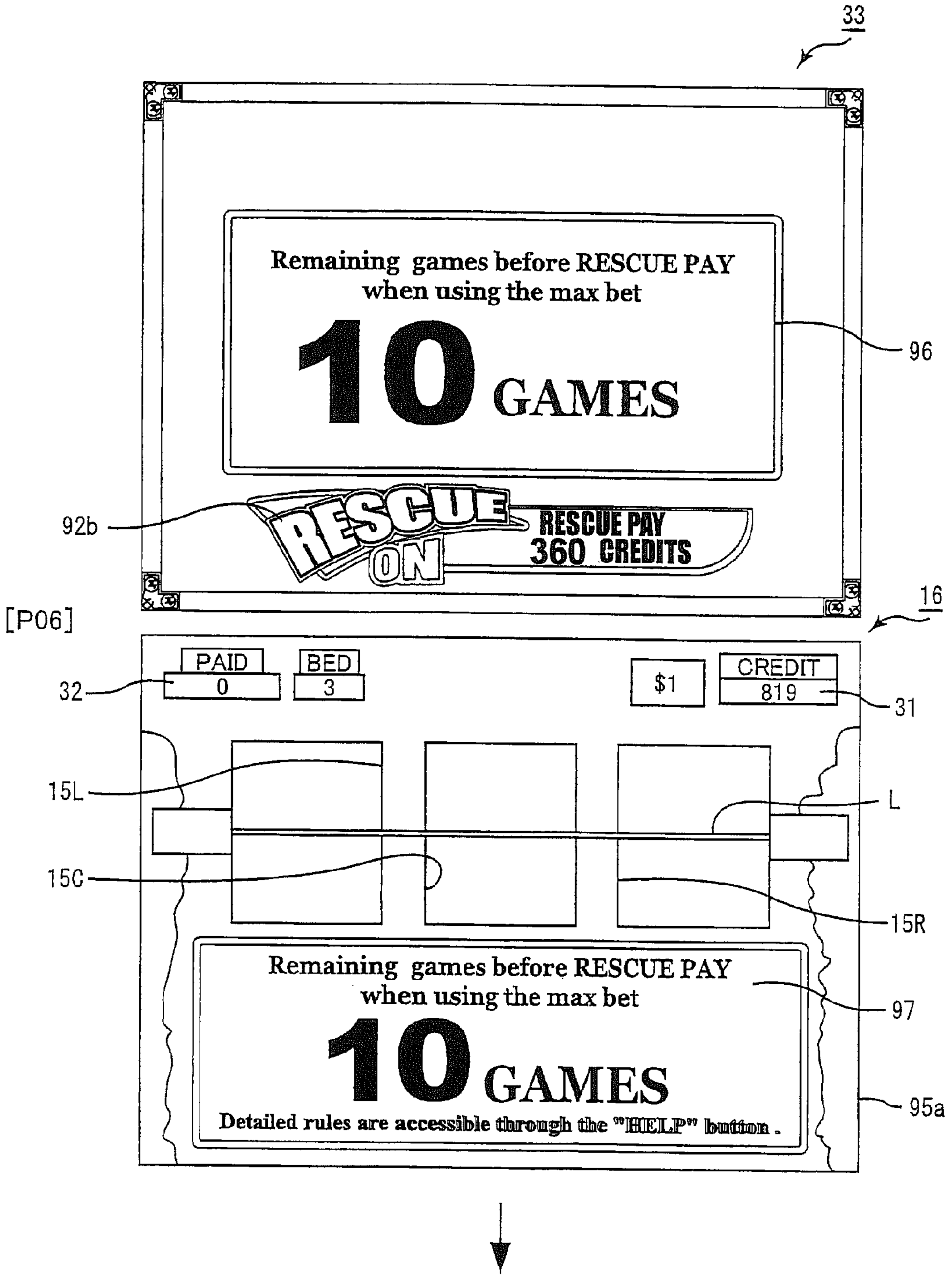
FIG. 6 is another view showing exemplary images displayed to the slot machine shown in FIG. 1.
Figure 6B:
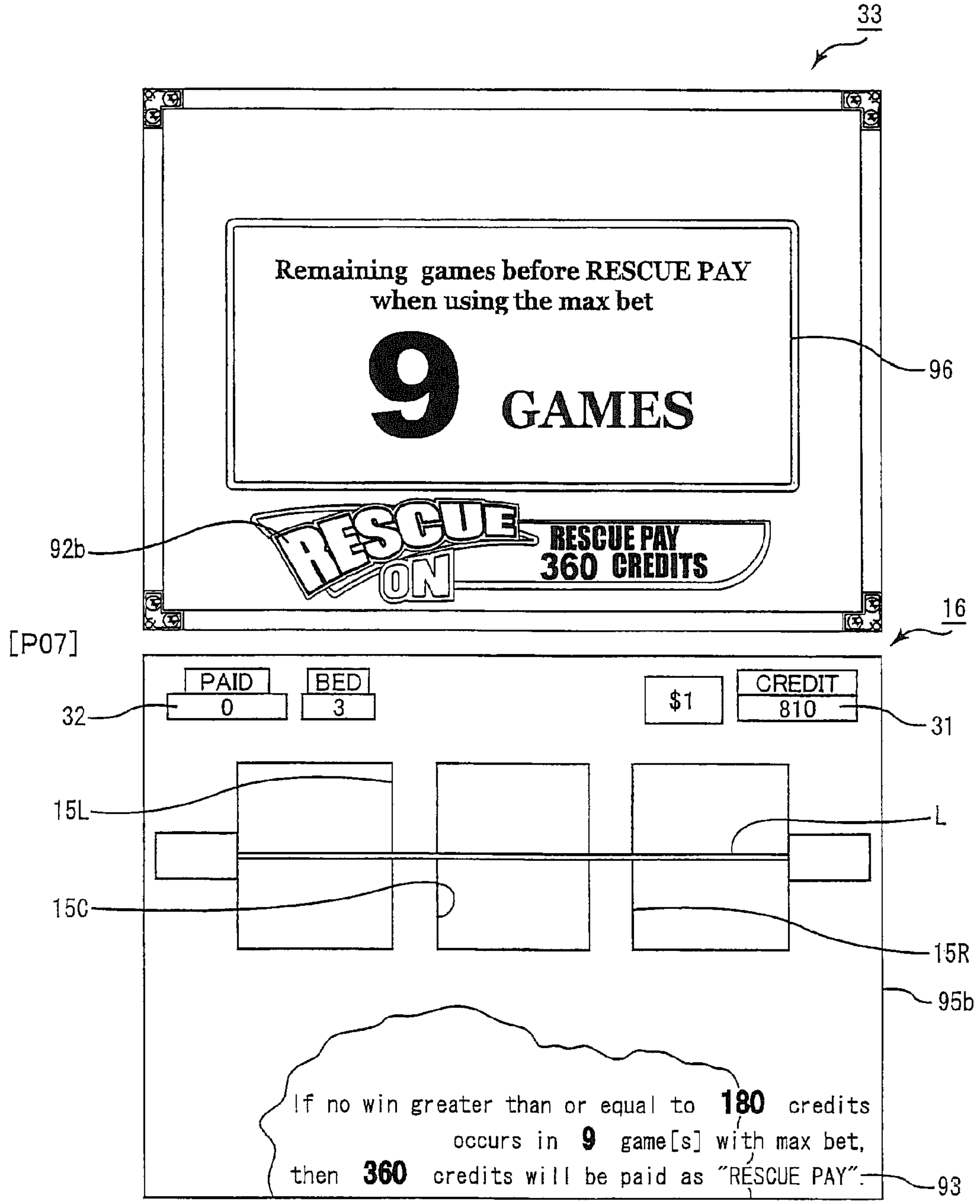

When the number of games in the insurance mode reaches 990 (notice set value), as shown in FIG. 6, to the upper image display panel 33, the image 92*b* is displayed which shows that the current gaming state is the insurance mode and an image 96 is displayed which shows that the number of games left to be played until the number of games to be counted reaches the specific number is ten.

Further, also to the lower image display panel 16, an image 97 is displayed which shows that the number of games left to be played until the number of games to be counted reaches the specific number is ten.

Moreover, a specific effect image 95*a* is displayed to the lower image display panel 16. The specific effect image 95 is displayed after the number of games to be counted has reached the notice set value, in the insurance mode.

When the number of games played in the insurance mode becomes 991, the number of games left to be played which is shown by the image 96 displayed to the upper image display panel 33 changes from ten to nine.

Further, also to the lower image display panel 16, the image 93 is displayed which shows that the number of games left to be played until the number of games to be counted reaches the specific number is nine.

Moreover, a specific effect image 95*b* is displayed to the lower image display panel 16.

The specific effect image 95*b* is a video picture with its contents continued from the specific effect image 95*a* in [P06].

[P08] to [P15]

Subsequently, as the number of games in the insurance mode increases, the number of games left to be played shown by the image 96 displayed to the upper image display panel 33 gradually decreases as shown in FIGS. 7 to 10. Further, in the lower image display panel 16, the number of remaining games shown by image 93 is gradually decreased. Moreover, to the lower image display panel 16, specific effect images 95*c* to 95*j* are sequentially displayed according to the number of games left to be played.

The specific effect image 95 is a video picture where a character (angel) performs a series of actions (action of appearing and spreading her wings), and specific effect images 95*a* to 95*j* are made by dividing the specific effect image 95 into a plurality of images along the time axis.

[P16]

When the number of games in the insurance mode reaches the specific number, 360 coins (credits) are paid out.

Figure 11A:
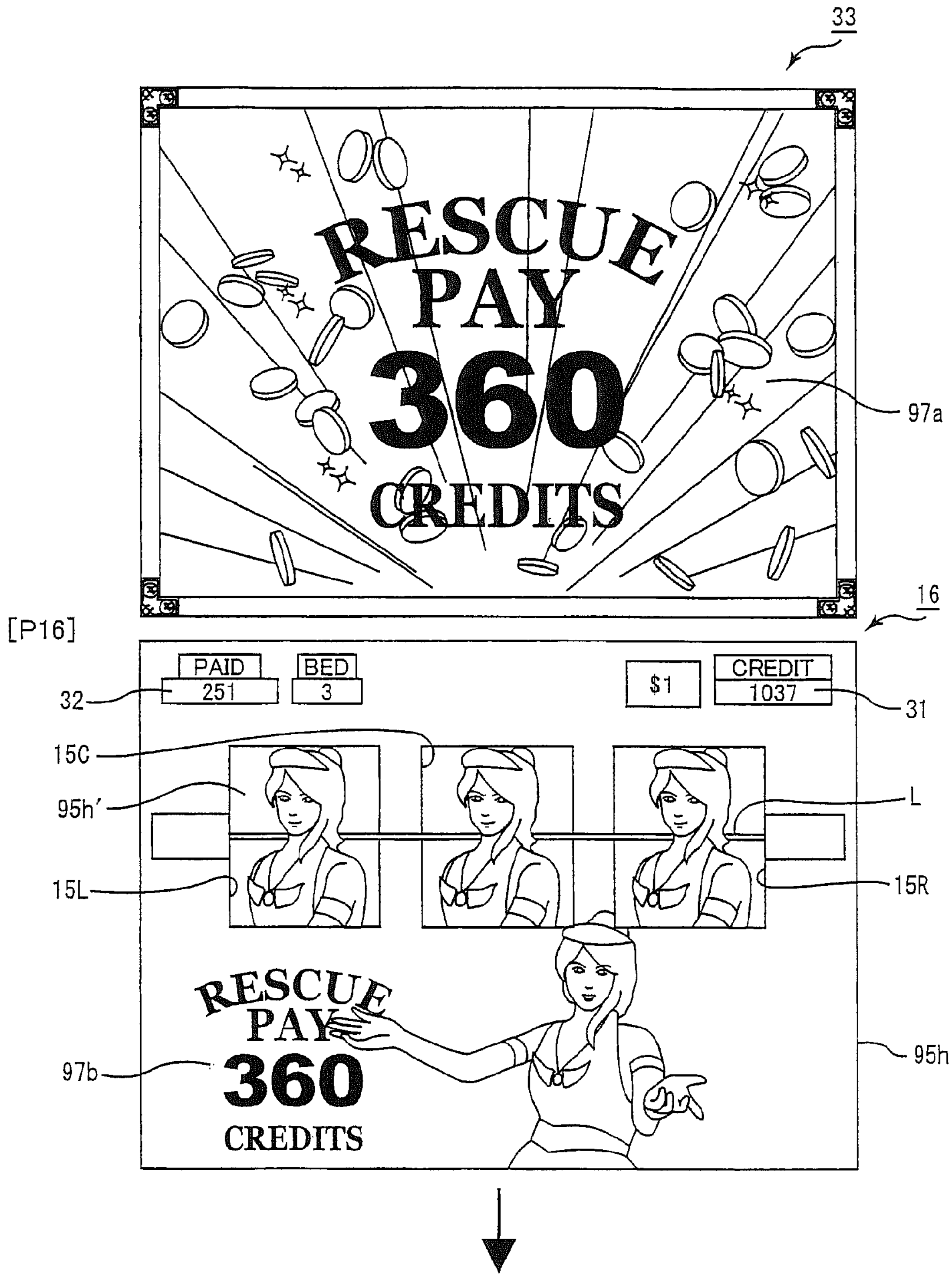
FIG. 11 is another view showing exemplary images displayed to the slot machine shown in FIG. 1.
Figure 11B:
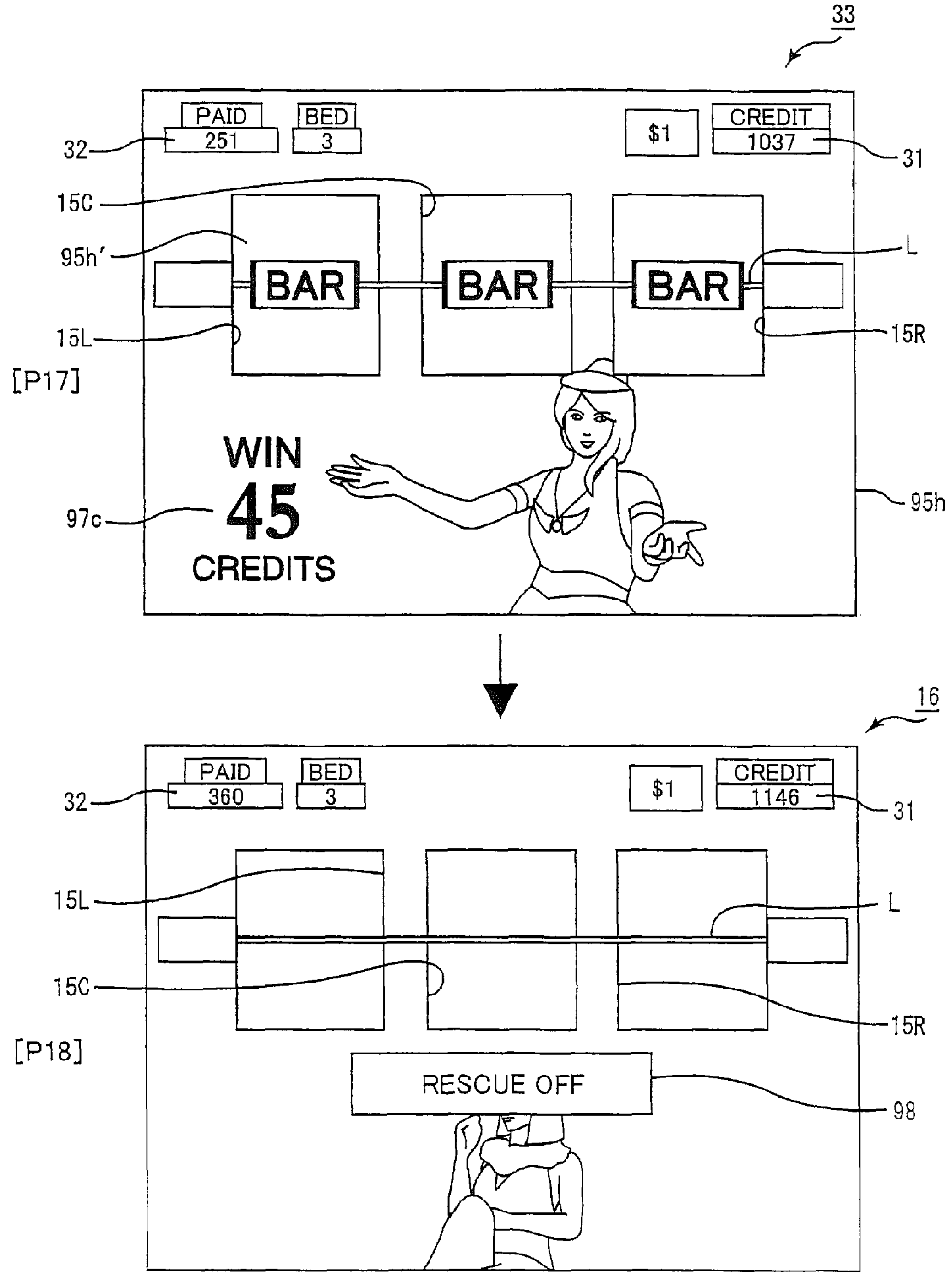

At this time, as shown in FIG. 11, an image 97*a* is displayed to the upper image display panel 33, the image 97*a* showing that coins are being paid out based on that the number of games in the insurance mode has reached the specific number. Further, a similar image 97*b* is also displayed to the lower left side of the lower image display panel 16.

Moreover, to the lower image display panel 16, a specific effect image 95*h* with its contents continued from the specific effect images 95*a* to 95*j*. Furthermore, a specific effect image 95*h*' is displayed in the display windows 15 (15L, 15C, 15R).

It should be noted that, when a predetermined winning combination is established in a game with which the number of games in the insurance mode has reached the specific number, coins are paid out based on that the number of games has reached the specific number, and thereafter, coins are paid out based on the above-mentioned winning combination.

At this time, while the specific effect image 95*h* is continuously displayed to the lower image display panel 16, the specific effect image 95*h*' in the display windows 15 disappears so that the reels 14 becomes visible.

Further, an image 97*c* is displayed to the lower left side of the lower image display panel 16, the image 97*c* showing that coins are being paid out according to the above-mentioned winning combination.

[P18]

At the end of the game with which the number of games in the insurance mode has reached the specific number, the number of games is cleared, and the mode is shifted from the insurance mode to the non-insurance mode.

At this time, an image 98 showing "RESCUE OFF" is displayed to the lower image display panel 16. The image 98 is an image showing that the mode has been shifted from the insurance mode to the non-insurance mode.

[P19]

Figure 12A:
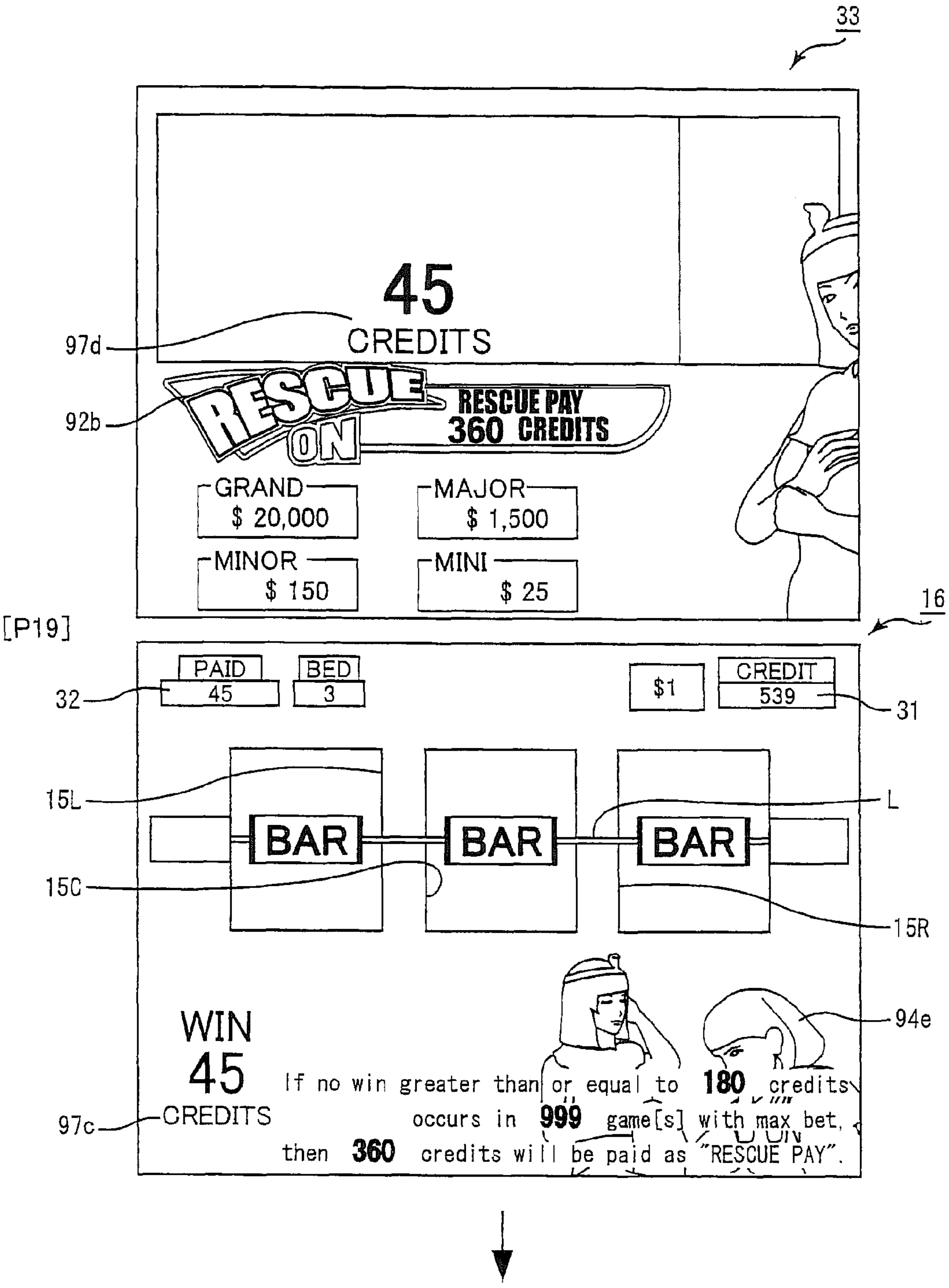
FIG. 12 is another view showing exemplary images displayed to the slot machine shown in FIG. 1.
Figure 12B:
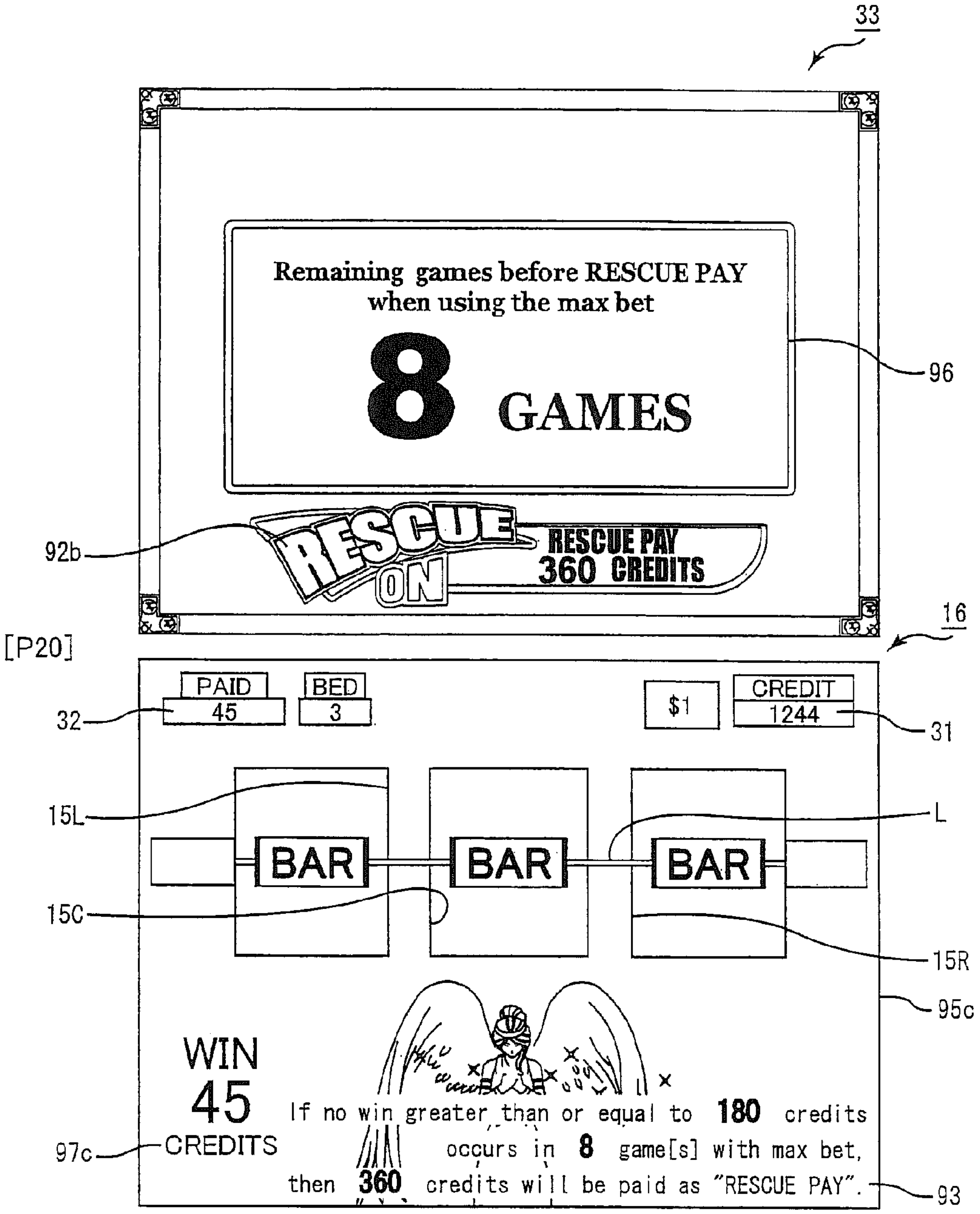

In a case where the number of games has not reached 990 (notice set value) in the insurance mode, when the combination of symbols "BAR"-"BAR"-"BAR" accompanied by coin-outs is established, an image 97*d* showing "45 CREDITS" is displayed to the upper image display panel 33 as shown in FIG. 12.

The image 97*d* is an image showing the number of coins to be paid out according to the combination of symbols "BAR"-"BAR"-"BAR".

Further, the image 92*b* showing "RESCUE ON" is displayed to the upper image display panel 33. The image 92*b* is an image showing that the current gaming state is the insurance mode.

An effect image 94*e* corresponding to "BAR"-"BAR"-"BAR" is displayed to the lower image display panel 16.

Moreover, to the lower image display panel 16, the image 93 is displayed which shows the number of games left to be played until the number of games to be counted reaches the specific number, and the image 97*c* is displayed which shows the number of coin-outs according to the combination of symbols "BAR"-"BAR"-"BAR".

[P20]

After the number of games has reached 990 (notice set value), when the combination of symbols "BAR"-"BAR"-"BAR" accompanied by coin-outs is established in the insurance mode as in [P19], the image 97*c* is displayed to the lower image display panel 16, the image 97*c* showing the number of coin-outs according to the combination of symbols "BAR"-"BAR"-"BAR".

Figure 7A:
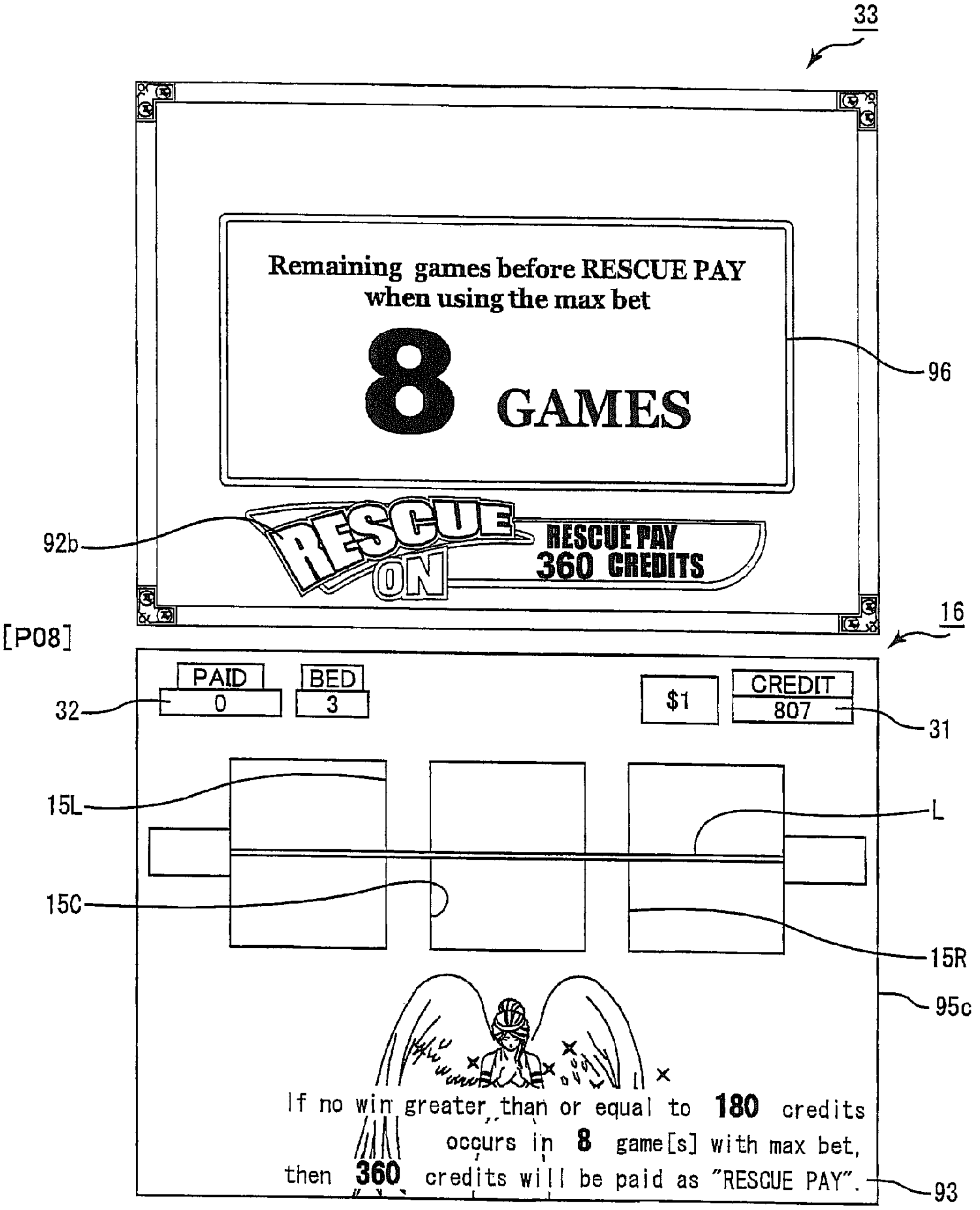
FIG. 7 is another view showing exemplary images displayed to the slot machine shown in FIG. 1.
Figure 7B:
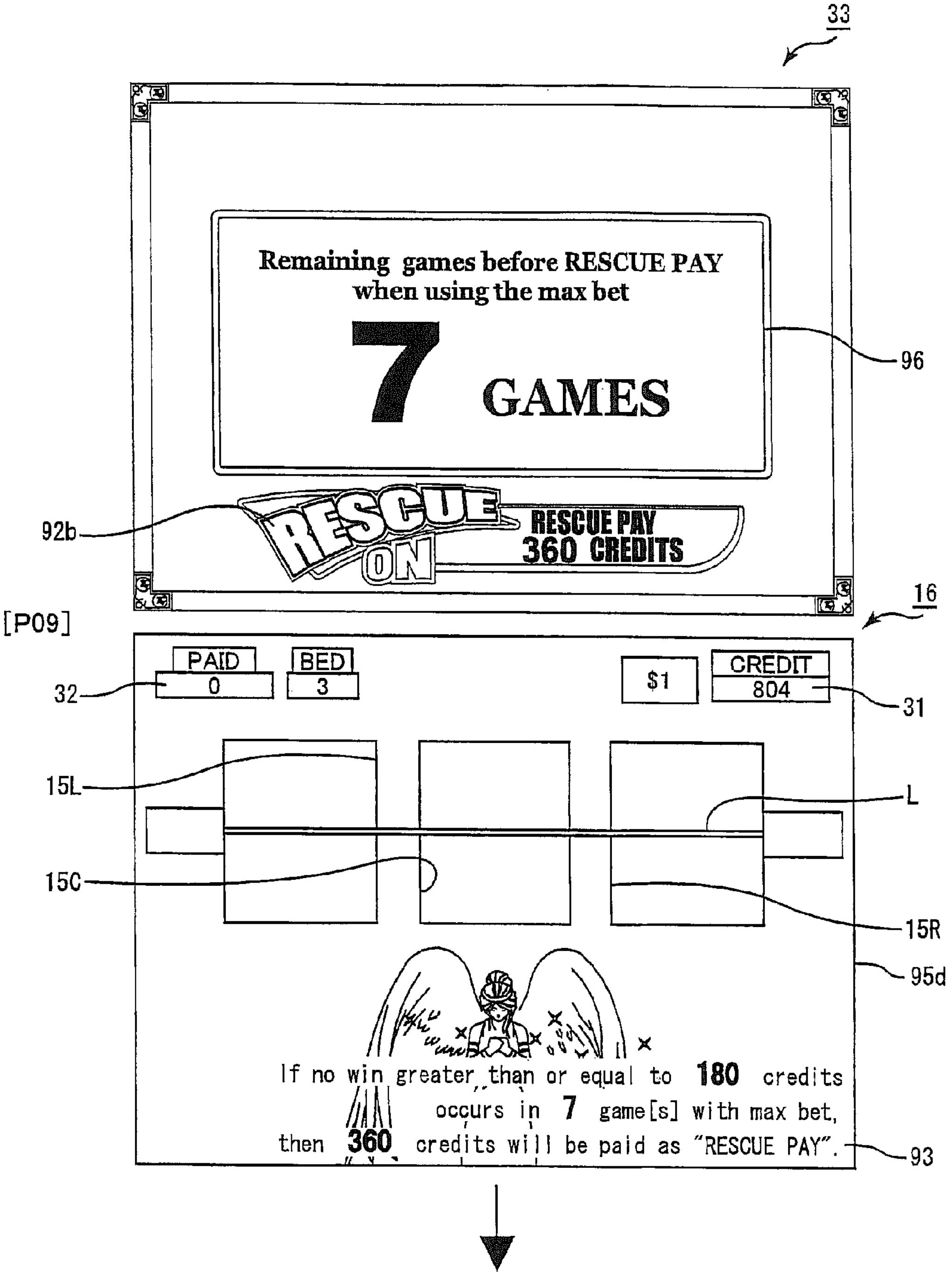
Figure 7C:
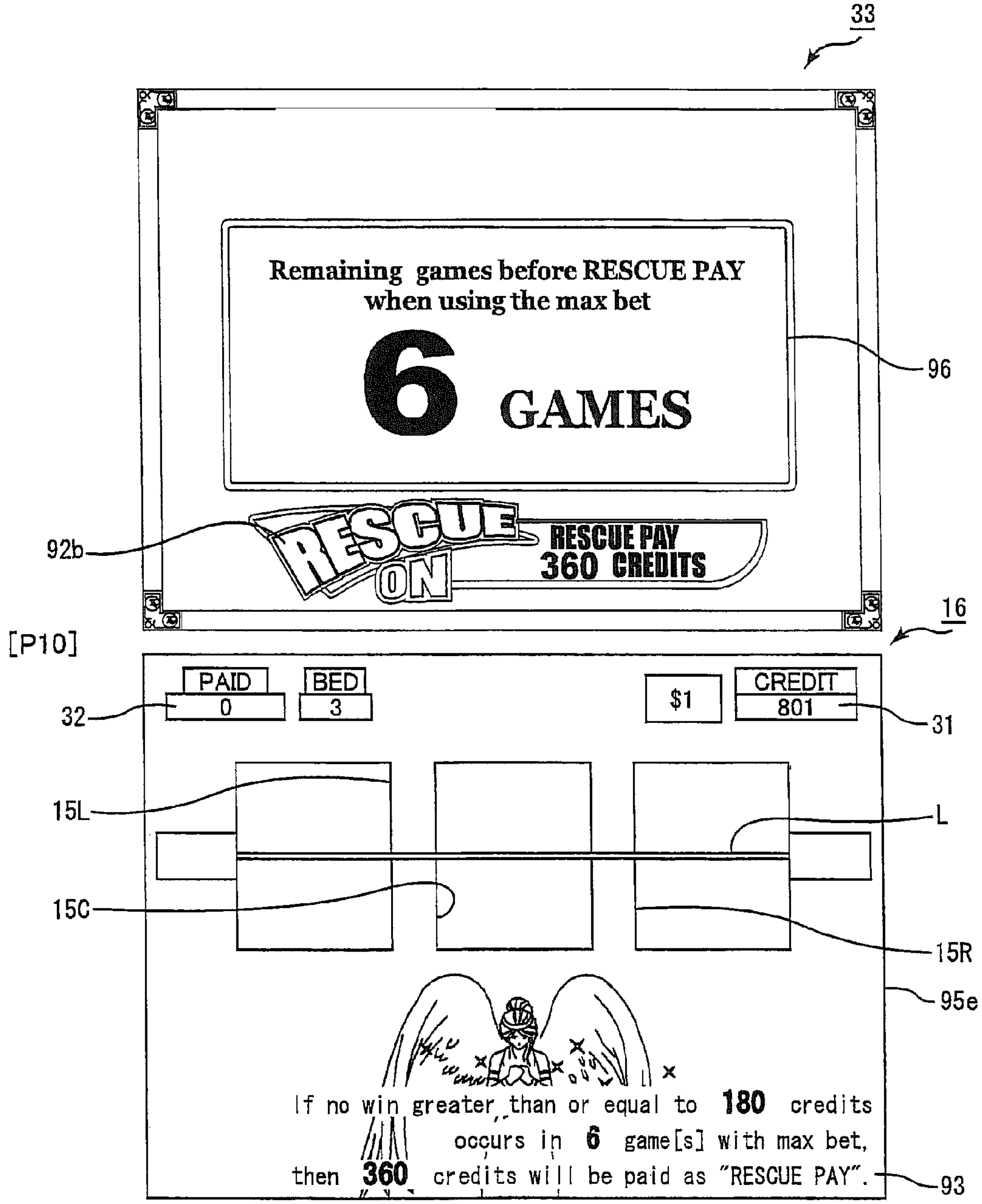
Figure 8A:
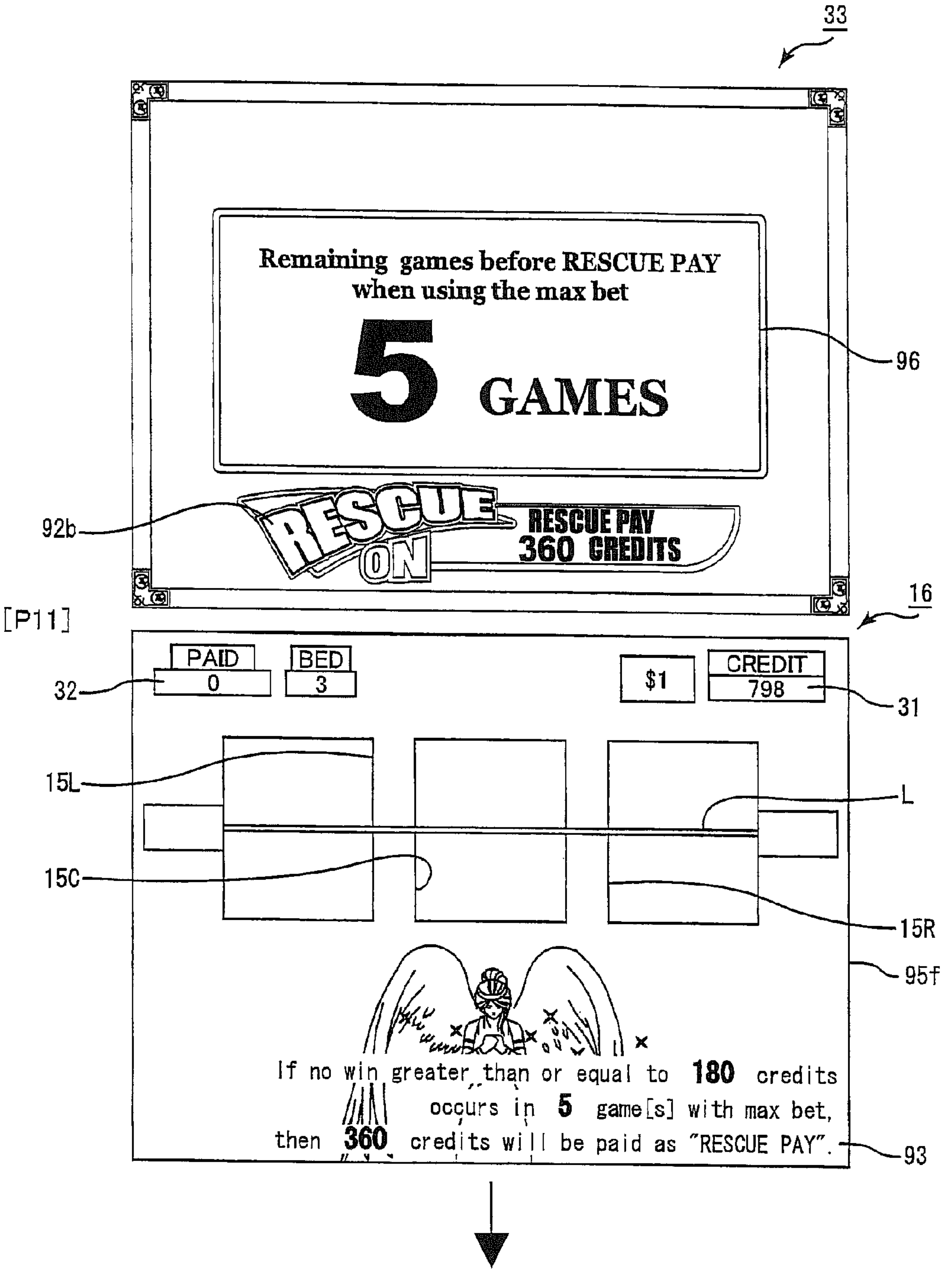
FIG. 8 is another view showing exemplary images displayed to the slot machine shown in FIG. 1.
Figure 8B:
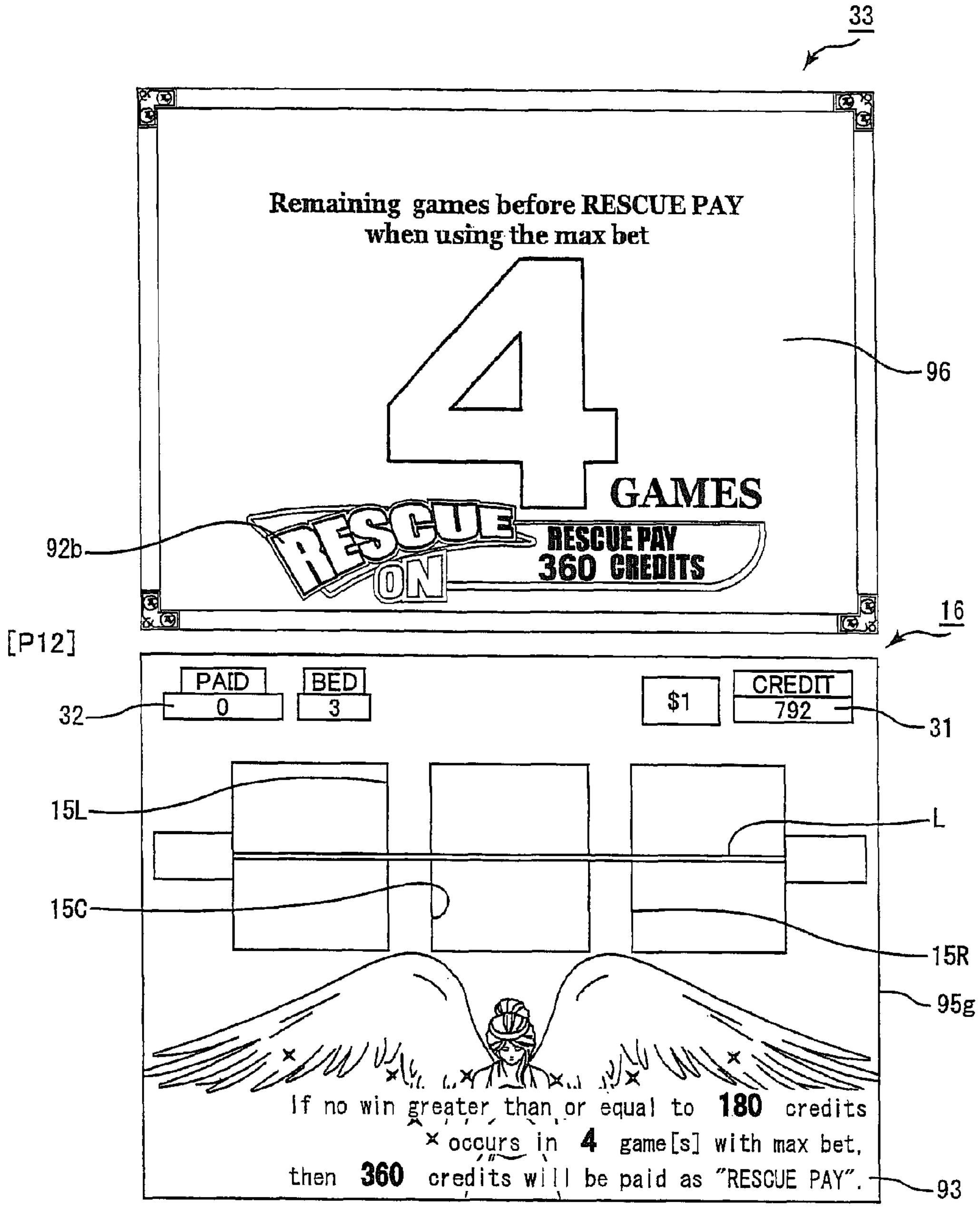
Figure 9A:
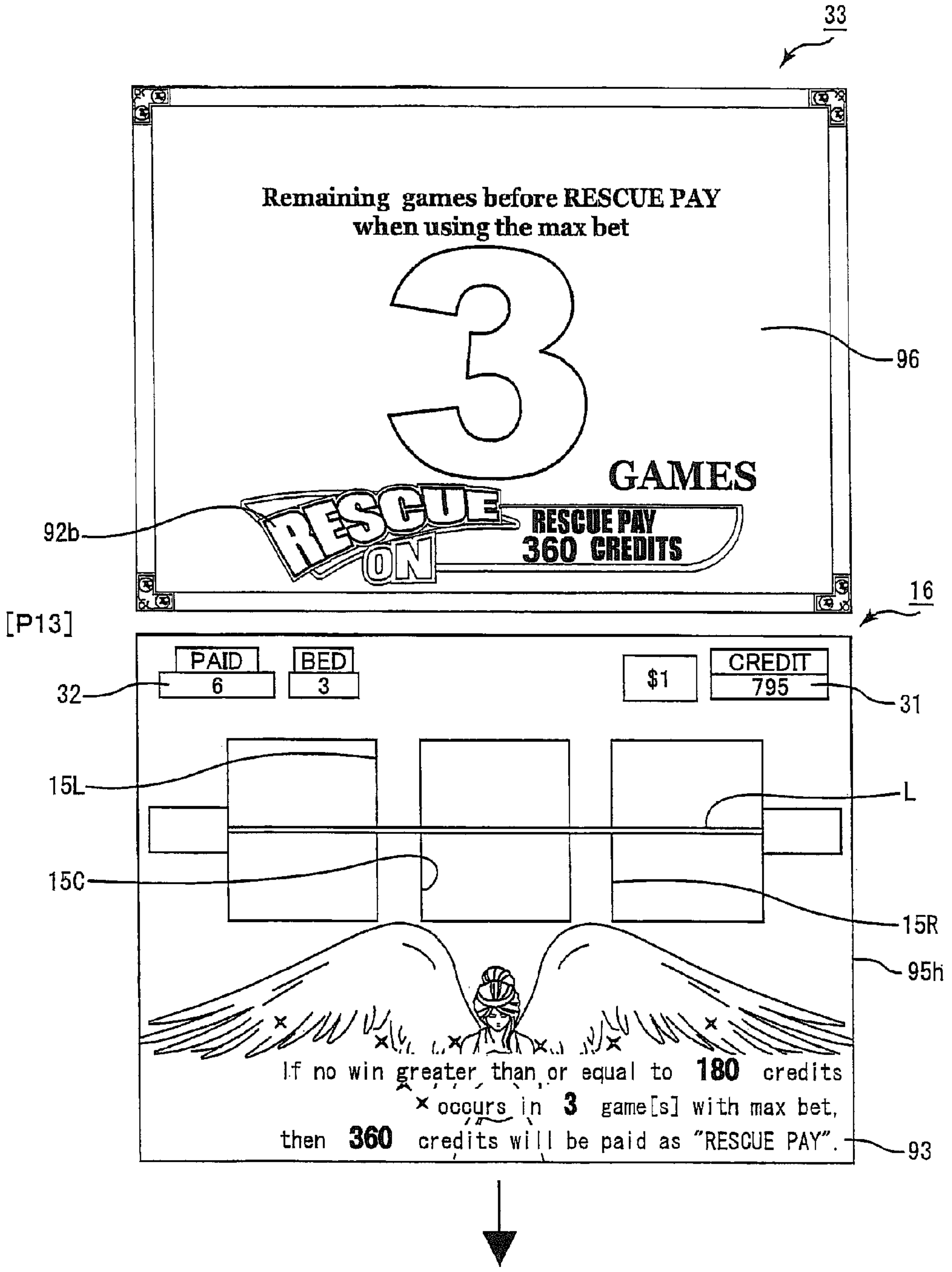
FIG. 9 is another view showing exemplary images displayed to the slot machine shown in FIG. 1.
Figure 9B:
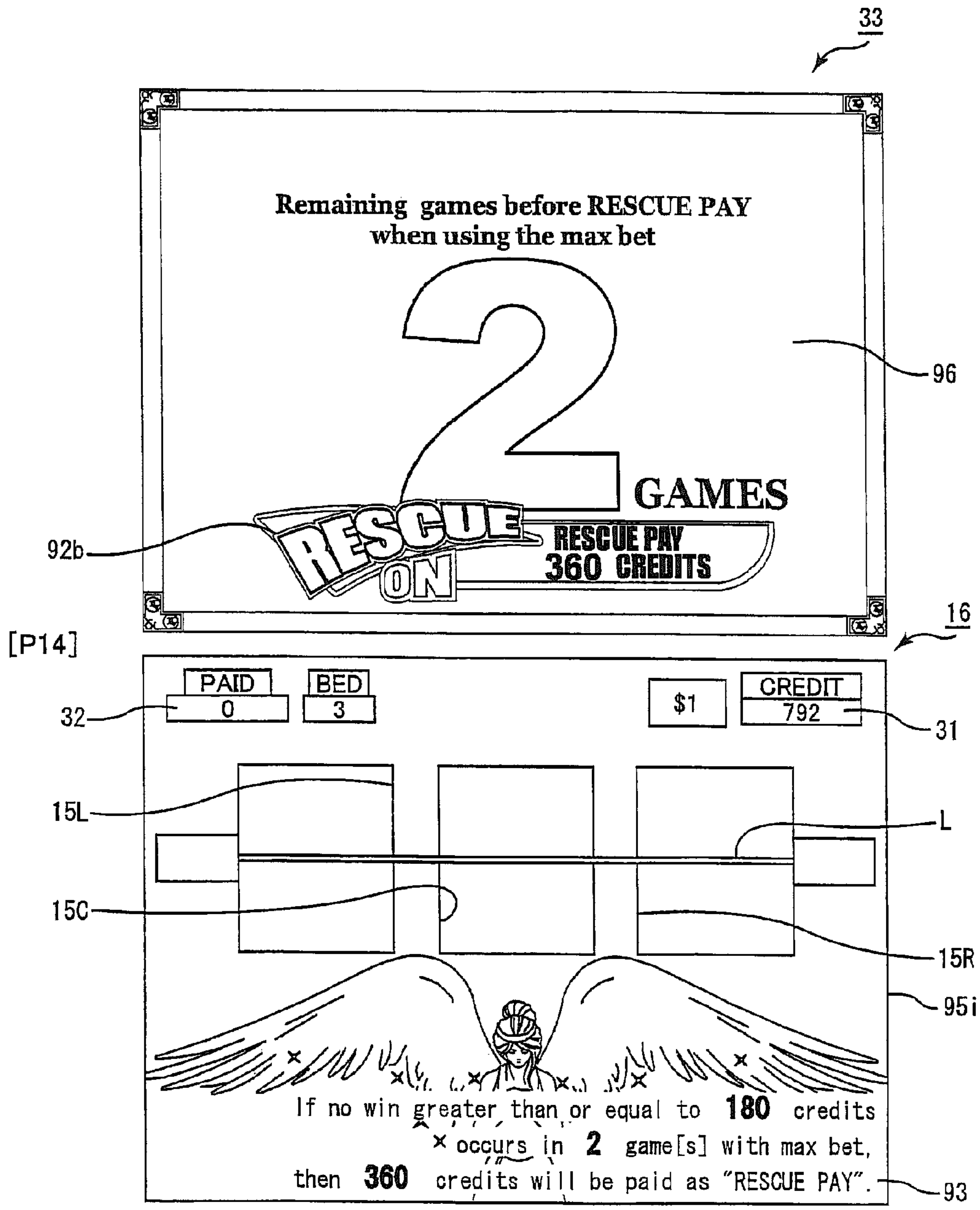
Figure 10:
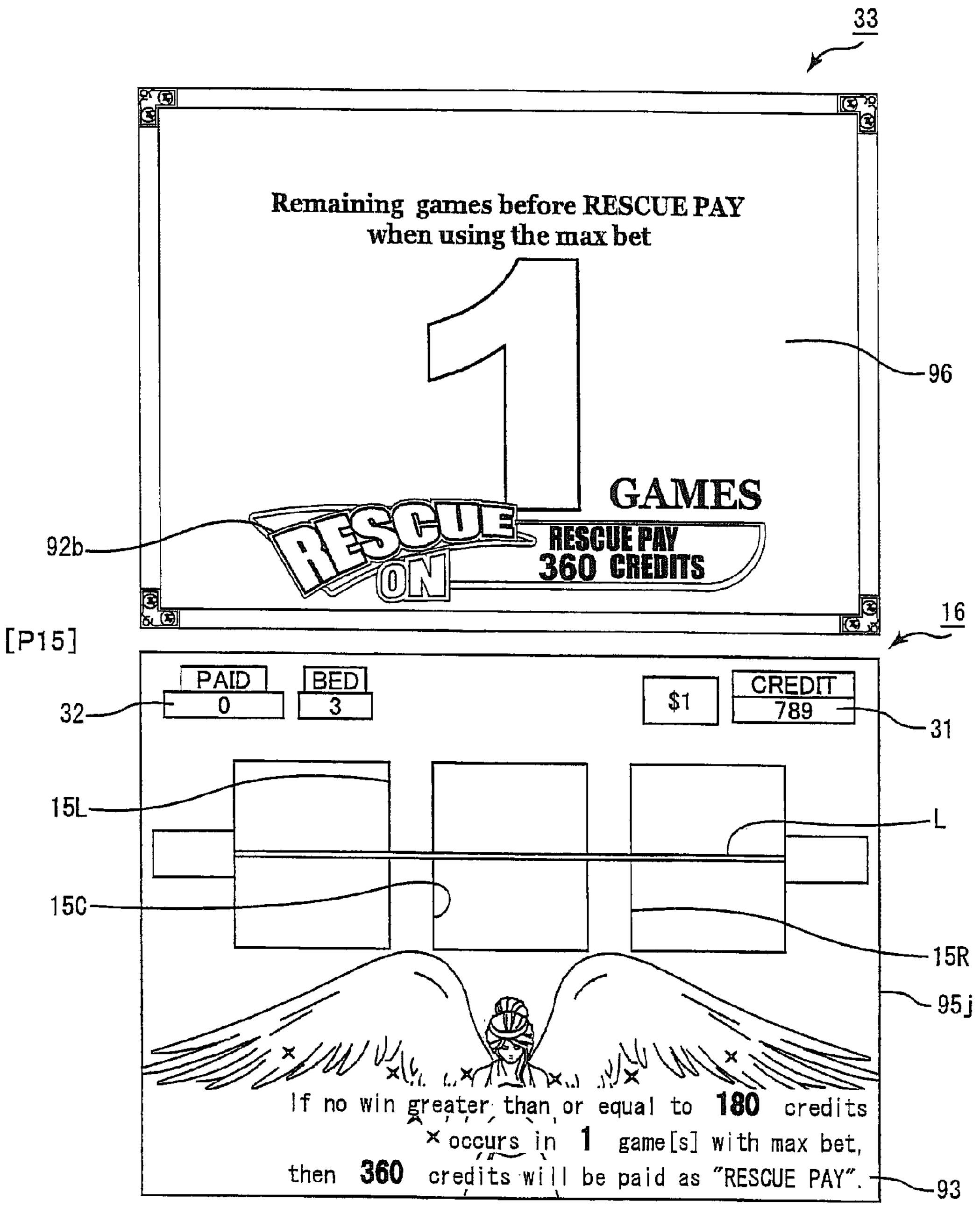
FIG. 10 is another view showing exemplary images displayed to the slot machine shown in FIG. 1.

However, an effect image 94*e* corresponding to the combination of symbols "BAR"-"BAR"-"BAR" is not displayed, and the specific effect image 95*c* is displayed as in [P08] (see FIG. 7). Other images are also displayed as in [P08].

[P21]

Figure 13A:
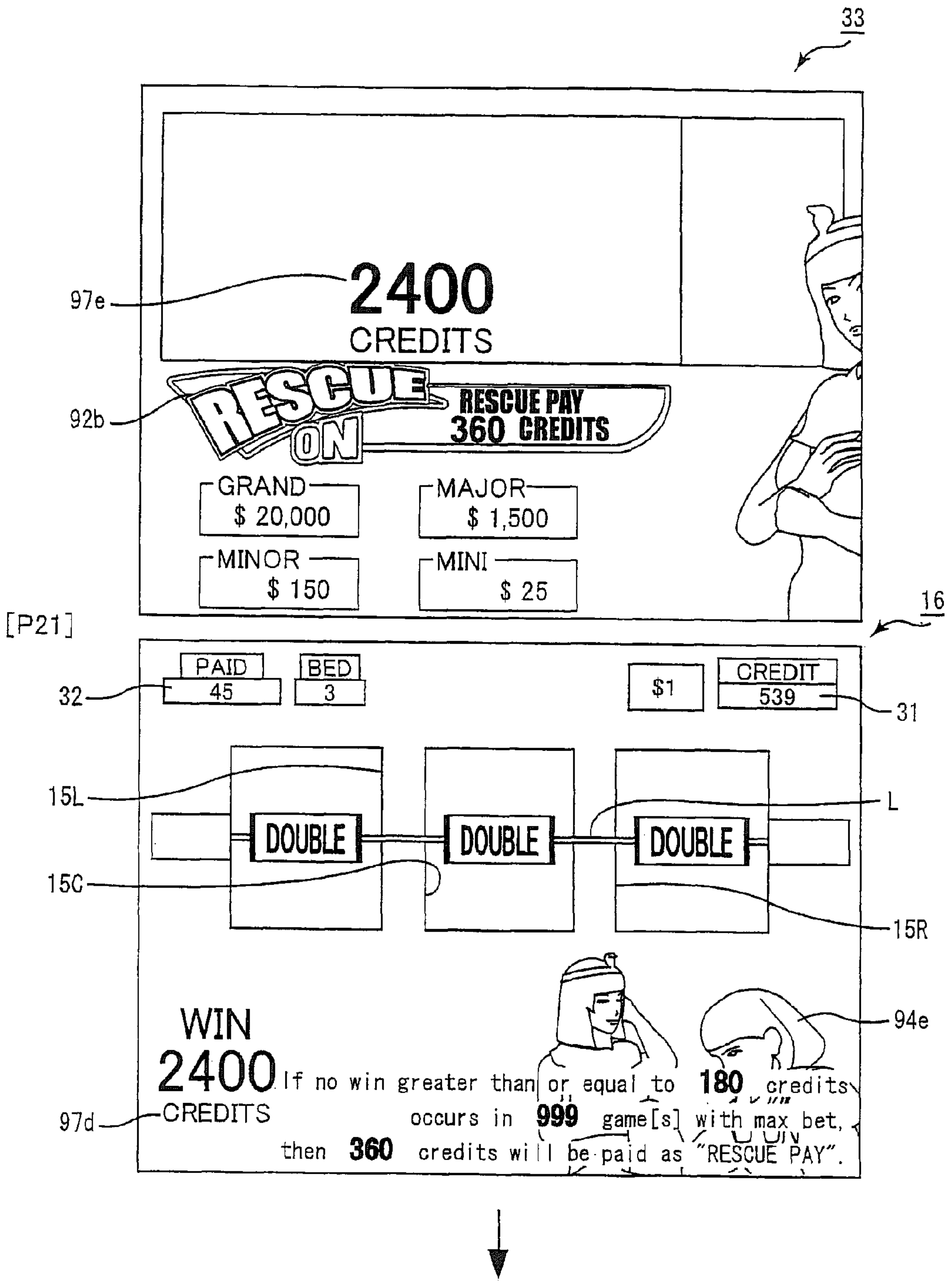
FIG. 13 is another view showing exemplary images displayed to the slot machine shown in FIG. 1.
Figure 13B:
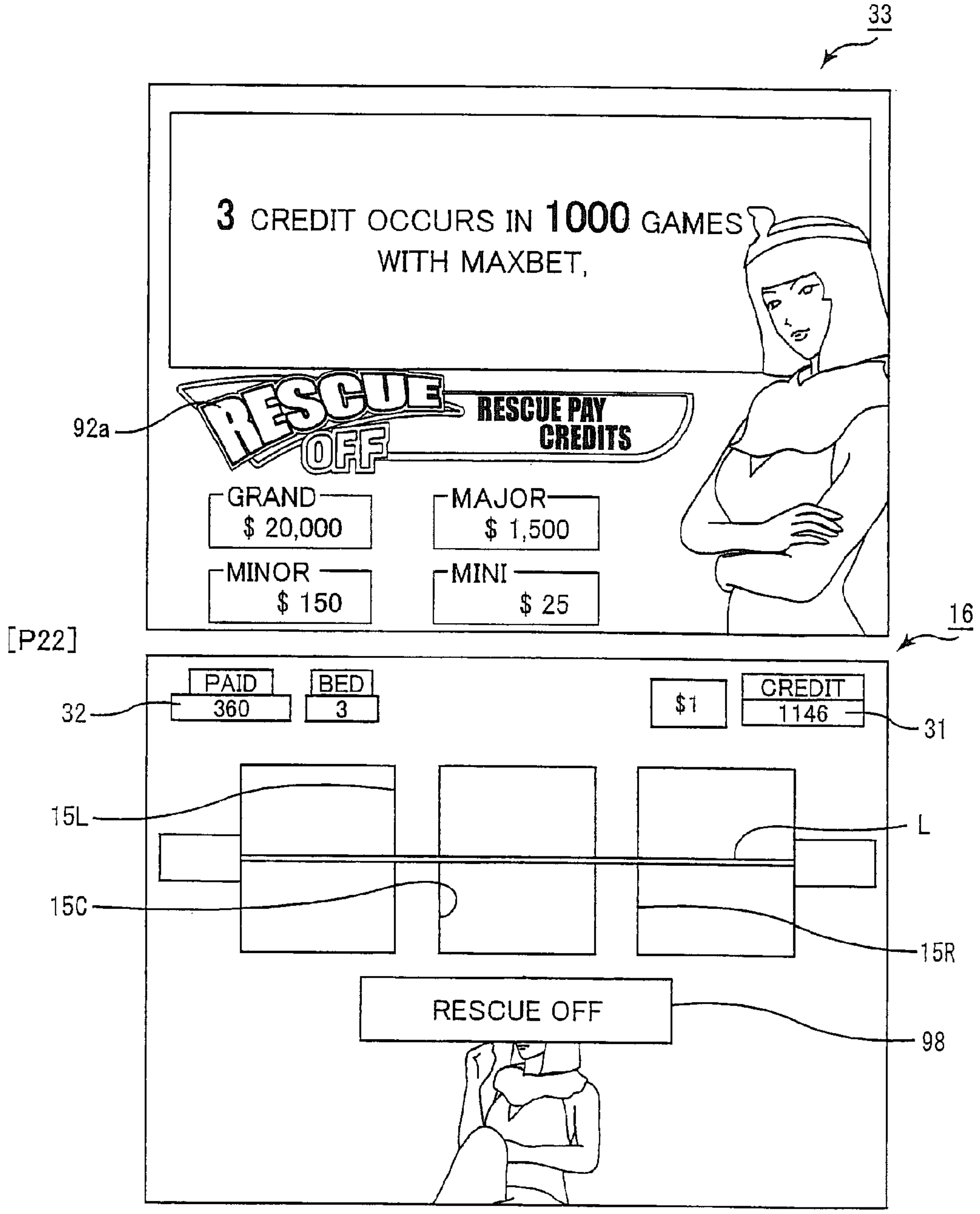

In the insurance mode, when a combination of symbols "DOUBLE"-"DOUBLE"-"DOUBLE" accompanied by a payout of equal to or more than 180 coins is established, an image 97*e* showing "2400 CREDITS" is displayed to the upper image display panel 33 as shown in FIG. 13. The image 97*e* is an image showing the number of coins to be paid out according to the combination of symbols "DOUBLE"-"DOUBLE"-"DOUBLE".

Further, the image 92*b* showing "RESCUE ON" is displayed to the upper image display panel 33. The image 92*b* is an image showing that the current gaming state is the insurance mode.

An effect image 94*e* corresponding to the combination of symbols "DOUBLE"-"DOUBLE"-"DOUBLE" is displayed to the lower image display panel 16. Also, to the lower image display panel 16, there are displayed the image 93 showing the number of games left to be played until the number of games to be counted reaches a specific number, and an image 97*d* showing the number of coins to be paid out according to the combination of symbols "DOUBLE"-"DOUBLE"-"DOUBLE".

[P22]

In the insurance mode, when a combination of symbols accompanied by a payout of equal to or more than 180 coins is established, the mode is shifted from the insurance mode to the non-insurance mode.

At this time, the image 92*a* showing "RESCUE OFF" is displayed to the upper image display panel 33. The image 92*a* is an image showing that the current gaming state is the non-insurance mode.

Further, the image 98 showing "RESCUE OFF" is displayed to the lower image display panel 16. The image 98 is an image showing that the mode has been shifted from the insurance mode to the non-insurance mode.

[P23]

In the event of the establishment of a winning combination for which the number of coin-outs is equal to or more than a predetermined number in the insurance mode and also in the count down of the number of remaining games, an image 99 indicating "When RESCUE PAY occurs, BONUS will be paid." is displayed to the lower image display panel 16. The image 99 is an image indicating that payment of game media based on this winning combination will be performed when the number of games reaches 1000 (hereinafter, also referred to as an image for notifying the player of later payment).

Such a winning combination causing the number of coin-outs equal to or more than the predetermined number corresponds to a predetermined combination of bonus triggers according to the present invention.

[P24]

Figure 14A:
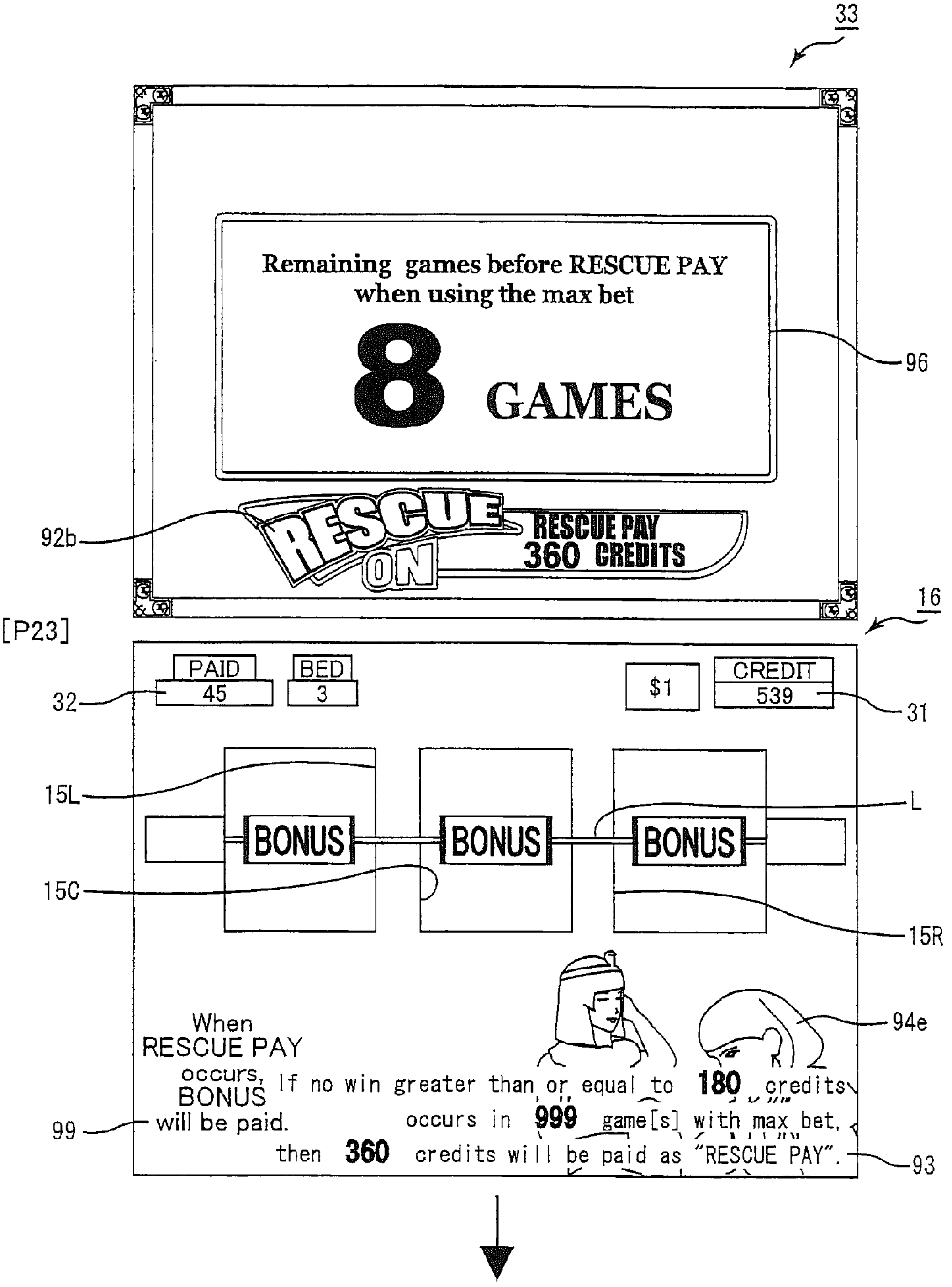
FIG. 14 is another view showing exemplary images displayed to the slot machine shown in FIG. 1.
Figure 14B:
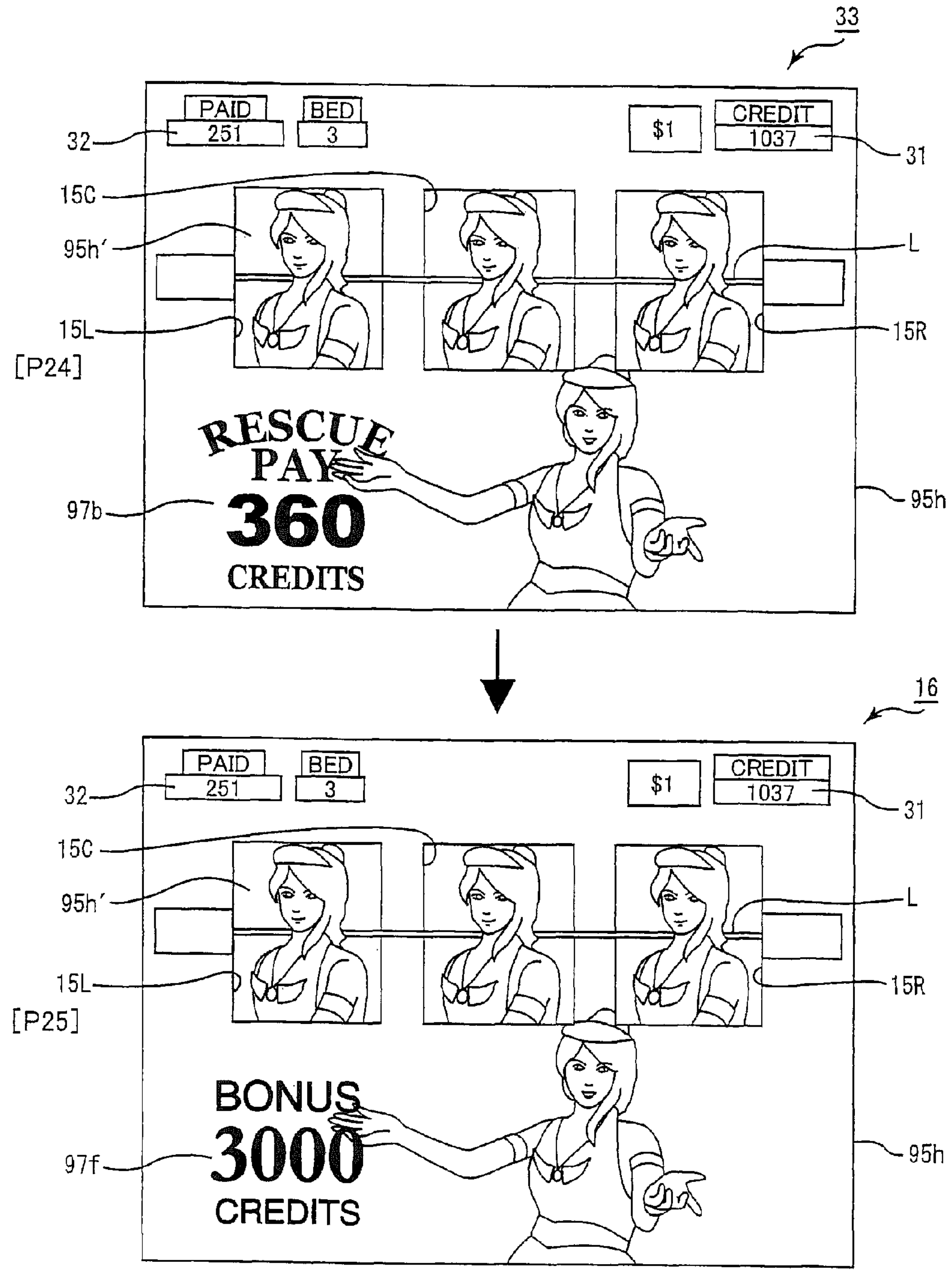

Thereafter, when the number of games in the insurance mode reaches the predetermined number, then 360 coins (credits) are paid out. At this time, as illustrated in FIG. 14, an image 97*a* indicating that payout of coins based on the number of games reaching the predetermined number in the insurance mode is displayed to the upper image display panel 33. Further, a similar image 97*b* is displayed to the lower image display panel 16 at the lower left side.

[P25]

Thereafter, an image 97*f* is displayed, wherein the image 97*f* indicates the fact that coins will be paid out according to the combinations (the combinations which cause payout of numbers of coins equal to or more than the predetermined number) established when the slot machine 10 was placed in the insurance mode and the number of remaining games was counted down.

In FIG. 14, images [P25] show a state in which payout based on the establishment of a bonus game trigger is being processed Next, processing conducted in the slot machine 10 are described.

[Main Processing]

Figure 15:
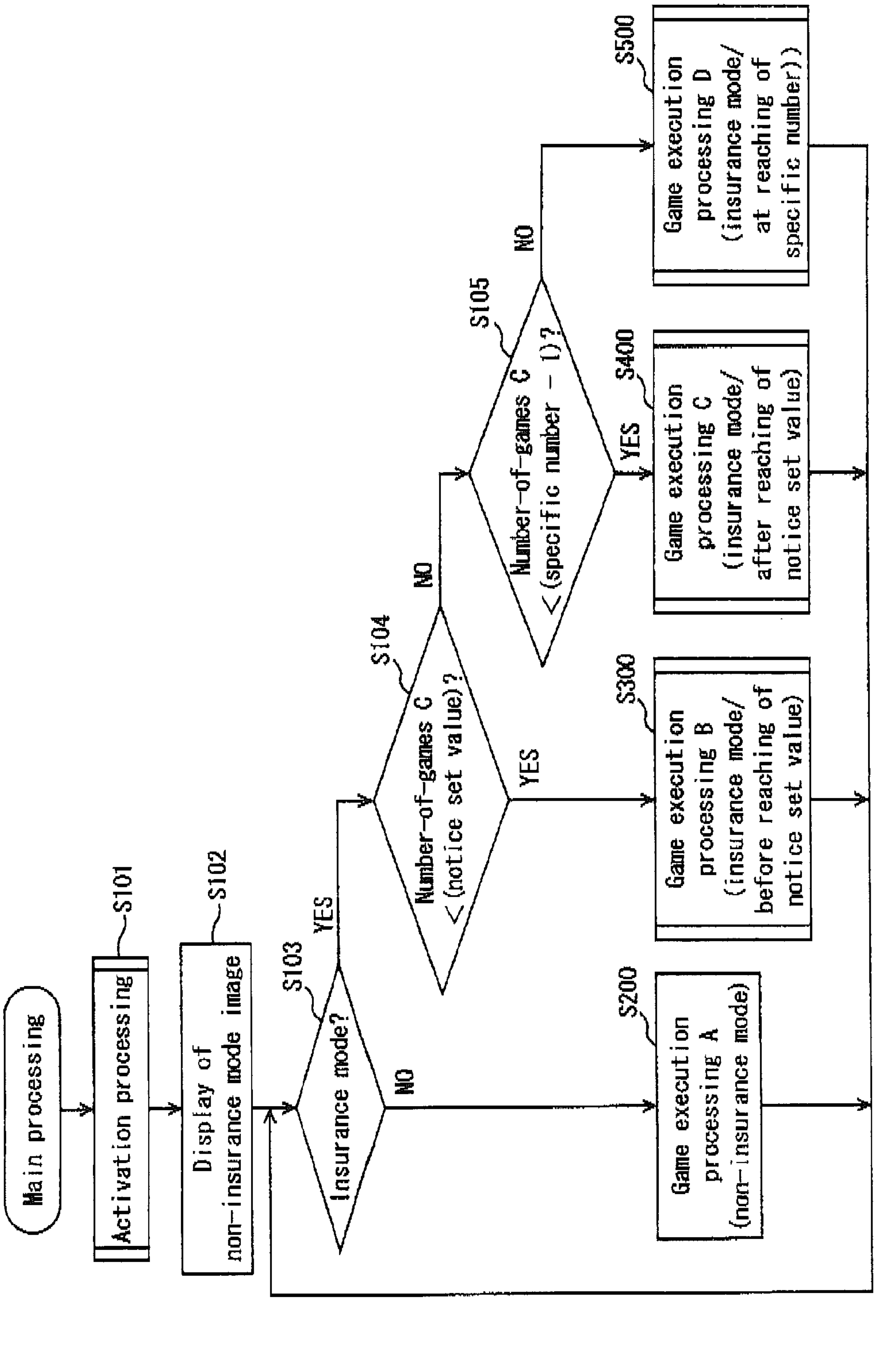
FIG. 15 is a flowchart showing main processing executed in the slot machine shown in FIG. 1.

FIG. 15 is a flowchart showing main processing performed in the slot machine 10.

Figure 21:
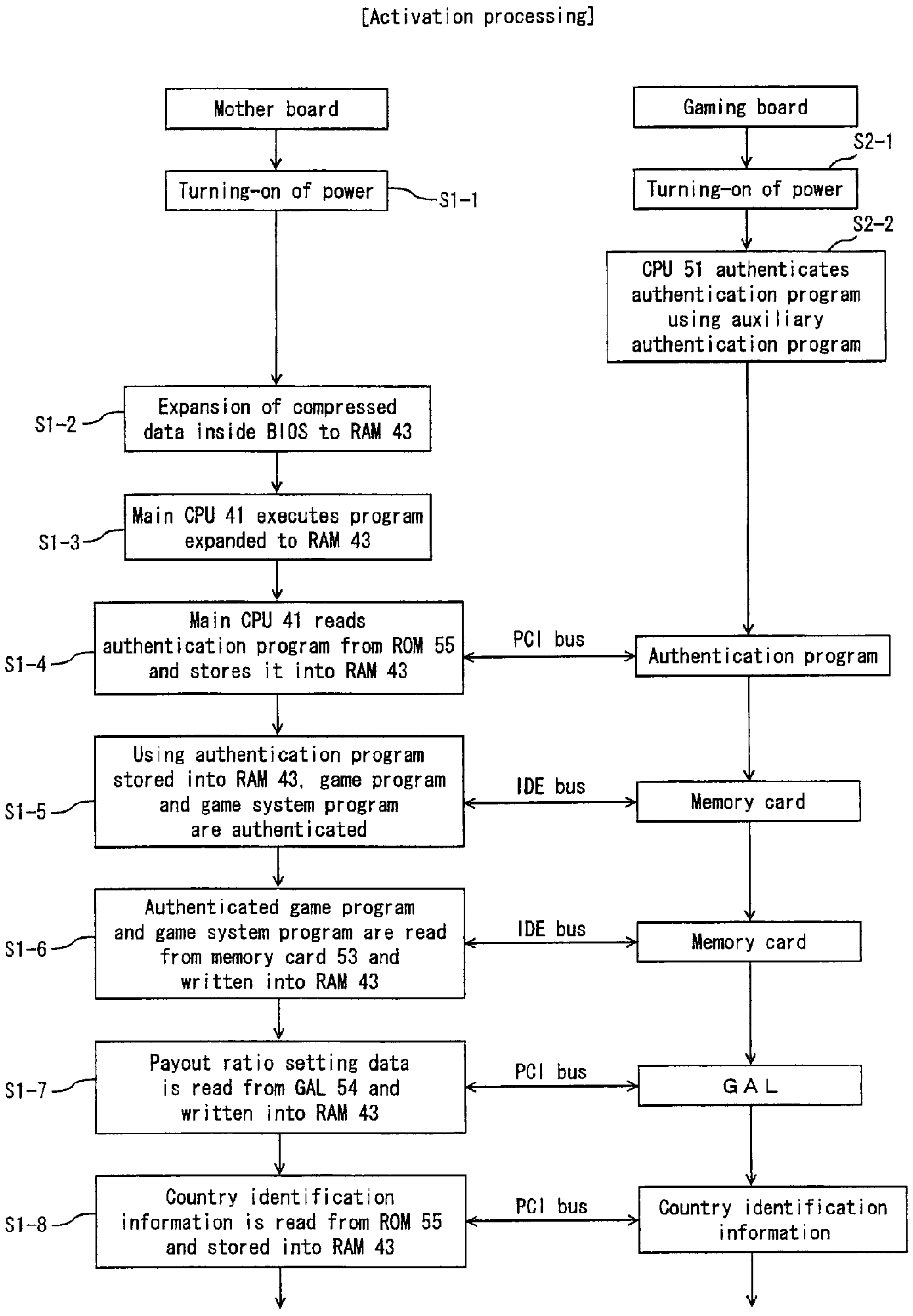
FIG. 21 is a chart showing a procedure of activation processing conducted by the mother board and the gaming board shown in FIG. 2.

First, activation processing is conducted in the slot machine 10 (step S101). The activation processing is specifically described later by using FIG. 21.

It is to be noted that, upon receipt of a detection signal outputted from the coin counter 21C when a coin inserted into the coin receiving slot 21 is detected by the coin counter 21C after the activation processing, the main CPU 41 conducts processing for adding the amount of inserted coins to the number of credits stored in the RAM 43 as interruption processing.

After the processing of step S101, the non-insurance mode is displayed in the slot machine 10 (step S102). In this processing, the main CPU 41 transmits a drawing command of the non-insurance mode image to the graphic board 68. On the graphic board 68, based on the above-mentioned drawing command, the VDP extracts image data from the RAM 43, expands it into a video RAM, generates image data of one frame, and outputs this image data to the upper image display panel 33 and the lower image display panel 16. This results in display of an image, for example as shown in [P01] (see FIG. 4), to the upper image display panel 33 and the lower image display panel 16.

Next, the main CPU 41 determines whether or not the current gaming state is the insurance mode, namely whether or not the insurance mode flag stored in the RAM 43 is "ON" (step S103).

When determining that the current gaming state is not the insurance mode in step S103, the main CPU 41 executes game execution processing A (non-insurance mode) (step S200), and then returns the processing to step S103. The game execution processing A is specifically described later by using FIG. 17.

On the other hand, when determining that the current gaming state is the insurance mode in step S103, the main CPU 41 then determines whether or not the number-of-games C stored in the RAM 43 is less than the notice set value (990 in the present embodiment) (step S104).

When determining that the number-of-games C is less than the notice set value in step S104, the main CPU 41 executes game execution processing B (insurance mode/before reaching the notice set value) (step S300), and then returns the processing to step S103. The game execution processing B is specifically described later by using FIG. 18.

On the other hand, when determining that the number-of-games C is not less than the notice set value in step S104, namely the number-of-games C is equal to or more than the notice set value, the main CPU 41 determines whether or not the number-of-games C stored in the RAM 43 is less than a value (999) smaller than the specific number by one (step S105).

When determining that the number-of-games C is less than the value smaller than the specific number by one in step S105, the main CPU 41 executes game execution processing C (insurance mode/after reaching the notice set value) (step S400) since the number-of-games C will not reach the specific number in the next game, and then main CPU 41 returns the processing to step S103. The game execution processing C is specifically described later by using FIG. 19.

When determining that the number-of-games C is the value smaller than the specific number by one in step S105, the main CPU 41 executes game execution processing D (insurance mode/at reaching of specific number) (step S500) since the number-of-games C may reach the specific number in the next game, and then the main CPU 41 returns the processing to step S103. The game execution processing D is specifically described later by using FIG. 20.

In the slot machine 10, insurance setting processing is conducted in a predetermined cycle when the non-insurance mode image is displayed (see [P01] in FIG. 4) as described above.

Figure 16:
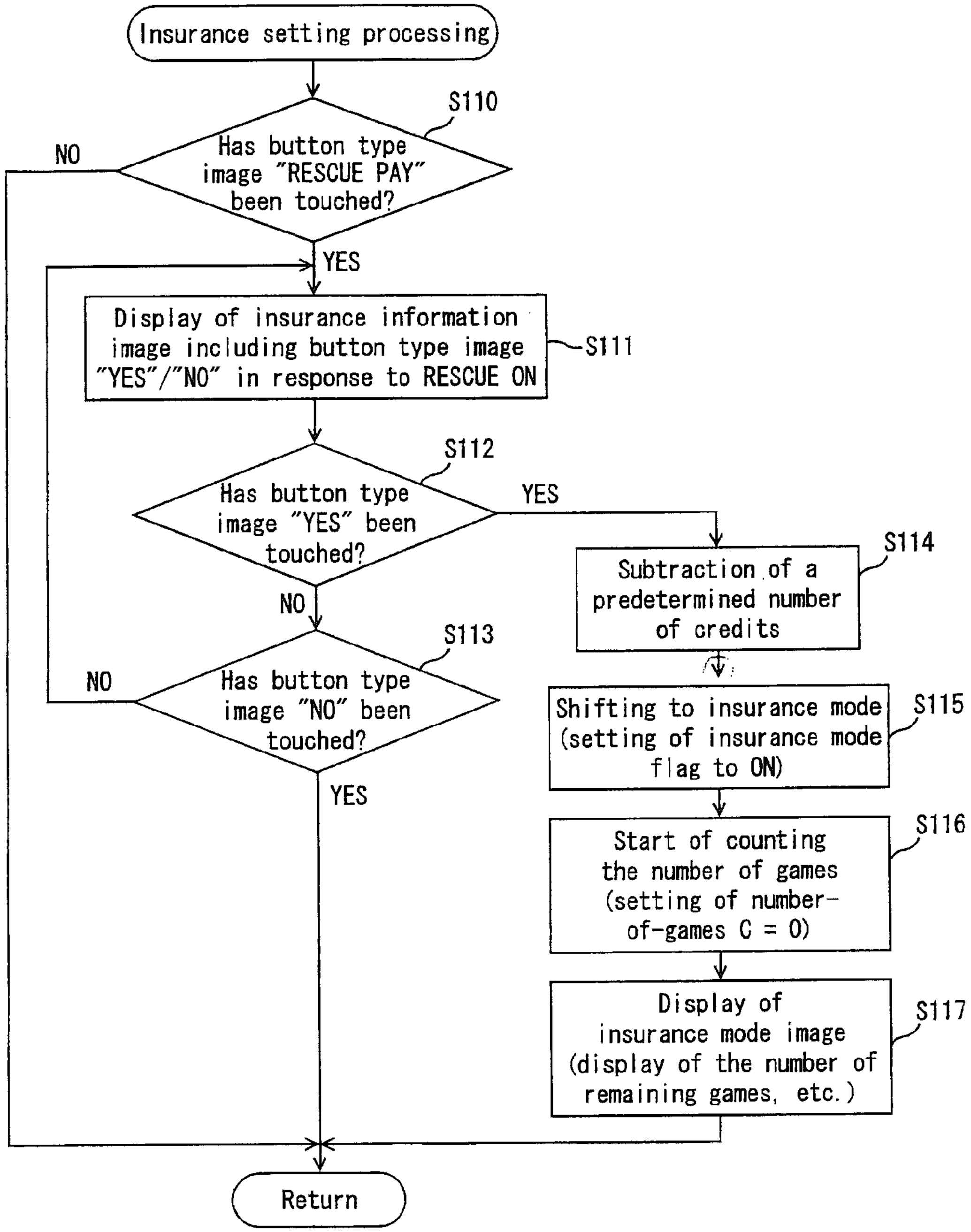
FIG. 16 is a flowchart showing a subroutine of insurance setting processing.

FIG. 16 is a flowchart showing a subroutine of the insurance setting processing.

First, the main CPU 41 determines whether or not the button type image "RESCUE PAY" 90*a* included in the image shown in [P01] displayed to the lower image display panel 16 has been touched, namely, whether or not to have received a detection signal that is outputted from the touch panel 69 when a predetermined place of the touch panel 69 corresponding to the display area of the button type image 90*a* is touched (step S110). When the main CPU 41 determines that the button type image 90*a* has not been touched, the present subroutine is terminated.

On the other hand, when determining that the button type image 90*a* has been touched, the main CPU 41 displays an insurance information image (see [P02] in FIG. 4), including the button type image "YES" 91*a* and the button type image "NO" 91*b* for responding to "RESCUE ON", to the lower image display panel 16 (step S111).

Next, the main CPU 41 determines whether or not the button type image "YES" 91*a* has been touched (step S112). When determining that the button type image "YES" 91*a* has not been touched in step S112, the main CPU 41 then determines whether or not the button type image "NO" 91*b* has been touched (step S113). When the main CPU 41 determines that the image "NO" 91*b* has been touched, the present subroutine is terminated. On the other hand, when the main CPU 41 determines that the image "NO" 91*b* has not been touched, the processing is returned to step S111.

When the button type image "YES" 91*a* has been touched in step S112, the main CPU 41 conducts processing for subtracting a predetermined number of credits (1 in the present embodiment) from the number of credits stored in the RAM 43 (step S114).

It should be noted that bills or coins that correspond to the number of credits may be inserted in place of subtracting the number of credits.

Next, the main CPU 41 sets the insurance mode flag stored in the RAM 43 to "ON" so as to shift the mode to the insurance mode (step S115).

The main CPU 41 then sets the number-of-games C to zero (the number-of-games C=0) in the data storage area showing the number-of-games C which is provided in the RAM 43, and starts counting the number of games (step S116).

Subsequently, the main CPU 41 displays the insurance mode images shown in [P03] (see FIG. 5) to the upper image display panel 33 and the lower image display panel 16 (step S117). The insurance mode image includes the image 93 showing the number of games left to be played until the number of games to be counted reaches the specific number, and some other images. After the processing of step S117, the present subroutine is terminated.

[Game Execution Processing A (Non-Insurance Mode)]

Figure 17:
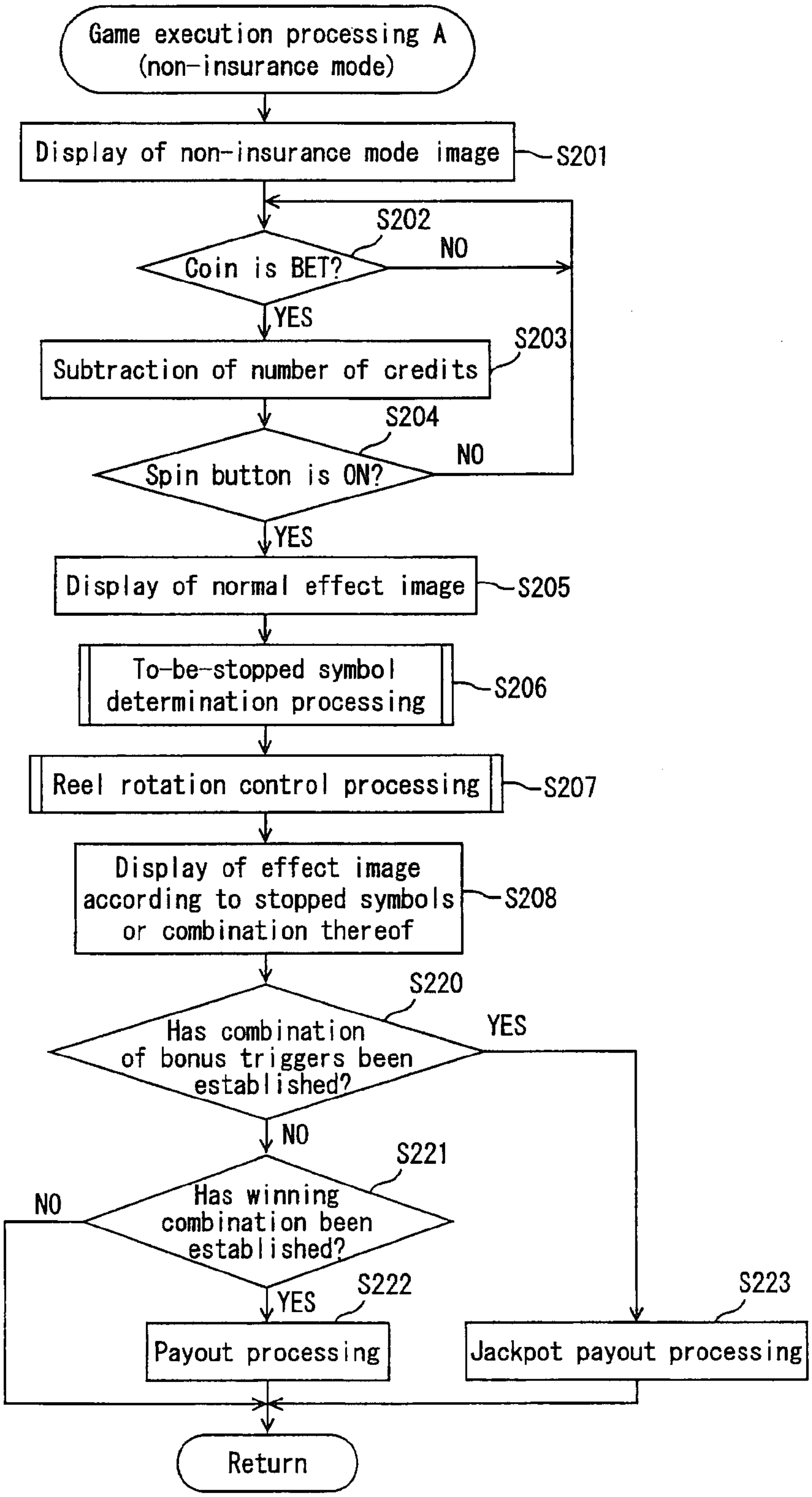
FIG. 17 is a flowchart showing a subroutine of game execution processing A (non-insurance mode).

FIG. 17 is a flowchart showing a subroutine of the game execution processing A called and executed in step S200 of the subroutine shown in FIG. 15.

First, the main CPU 41 conducts processing for displaying the non-insurance mode image (see [P01] in FIG. 4) to the upper image display panel 33 and the lower image display panel 16 (step S201).

Next, the main CPU 41 determines whether or not a coin has been BET (step S202). In this processing, the main CPU 41 determines whether or not to have received an input signal that is outputted from the 1-BET switch 26S when the 1-BET button 26 is operated, or an input signal that is outputted from a maximum BET switch 27S when the maximum BET button 27 is operated. When the main CPU 41 determines that the coin has not been BET, the processing is returned to step S202.

On the other hand, when determining that the coin has been BET in step S202, the main CPU 41 conducts processing for making a subtraction from the number of credits stored in the RAM 43 according to the number of coins BET (step S203). It is to be noted that, when the number of coins BET is larger than the number of credits stored in the RAM 43, the main CPU 41 does not conduct the processing for making a subtraction from the number of credits stored in the RAM 43, and the processing is returned to step S202. Further, when the number of coins BET exceeds the upper limit of the number of coins that can be BET in one game (three coins in the present embodiment), the main CPU 41 does not conduct the processing for making a subtraction from the number of credits stored in the RAM 43, and the processing is proceeded to step S204.

Next, the main CPU 41 determines whether or not the spin button 23 has been turned ON (step S204). In this processing, the main CPU 41 determines whether or not to have received an input signal that is outputted from the spin switch 23S when the spin button 23 is pressed.

When the main CPU 41 determines that the spin button 23 has not been turned on, the processing is returned to step S202.

It is to be noted that, when the spin button 23 is not turned ON (e.g. when the spin button 23 is not turned ON and a command to end the game is inputted), the main CPU 41 cancels a subtraction result in step S203.

In the present embodiment, a case is described where, after a coin is BET (step S202), the processing for making a subtraction from the number of credits is conducted (step S203) before it is determined whether or not the spin button 23 has been turned ON (step S204). However, the present invention is not limited to this example. For example, it may be determined whether or not the spin button 23 has been turned ON (step S204) after a coin is BET (step S202), and when it is determined that the spin button 23 has been turned ON (step S204: YES), the processing for making a subtraction from the number of credits may be conducted (step S203).

On the other hand, when determining that the spin button 23 has been turned ON in step S204 in FIG. 17, the main CPU 41 conducts processing for displaying a normal effect image (e.g. the normal effect image 94*a*). In the present embodiment, the normal effect image 94 had been displayed before the spin button 23 is turned ON, and another normal effect image 94 is displayed after the spin button 23 is turned ON. It should be noted that, in the present invention, the normal effect image 94 may be displayed after the spin button 23 is turned ON.

Next, the main CPU 41 conducts to-be-stopped symbol determination processing (step S206). In this to-be-stopped symbol determination processing, the main CPU 41 (arithmetic processing unit) executes a to-be-stopped symbol determination program stored in the RAM 43 (storage device) so as to determine a code No. in stopping the reels 14.

Thereby, a combination of symbols to be rearranged is determined. This processing is specifically described later by using FIGS. 22 and 25.

It should be noted that, in the present embodiment, a case is described where a combination of symbols to be rearranged is determined so as to determine one winning combination out of a plurality of types of winning combinations. However, in the present invention, for example, a random number may be used first so as to determine one winning combination to be selected randomly from the plurality of types of winning combinations, and thereafter, a combination of symbols to be rearranged may be determined based on the above-mentioned winning combination.

Next, the main CPU 41 conducts reel rotation control processing (step S207). This is the processing for starting rotation of all the reels 14 and then stopping rotation of the reels 14 so that the combination of symbols corresponding to the winning combination determined in step S206 is rearranged along the winning line L. This processing is specifically described later by using of FIGS. 23 to 25. Next, the main CPU 41 displays to the lower image display panel 16 an effect image according to rearranged symbols or a combination thereof (step S208).

Next, the main CPU 41 determines whether or not a combination of bonus triggers has been established (step S220). When it is determined that the combination of bonus triggers has been established, a single jackpot is selected out of four types of jackpots "GRAND", "MAJOR", "MINOR" and "MINI", and the number of coins set with respect to the selected jackpot is paid out (step S223). In the case of accumulating coins, the main CPU 41 conducts processing for adding a predetermined number of credits to the number of credits stored in the RAM 43. On the other hand, in the case of paying out coins, the main CPU 41 transmits a control signal to the hopper 66 in order to pay out a predetermined number of coins. At that time, the coin detecting portion 67 counts the number of coins paid out from the hopper 66, and when the counted value reaches a designated number, the coin detecting portion 67 transmits a payout completion signal to the main CPU 41. Thereby, the main CPU 41 stops driving of the hopper 66 and ends the coin payout processing. Thereafter, the present subroutine is terminated.

On the other hand, in step S220, when determining that the combination of bonus triggers has not been established, the main CPU 41 determines whether or not a winning combination has been established (step S221). When determining that the winning combination has been established, the main CPU 41 pays out coins according to the number of BETs and the winning combination (step S222). When it is determined that any of winning combinations has not been established in step S221, or when the processing of step S222 or S223 is executed, the present subroutine is terminated.

[Game Execution Processing B (Insurance Mode/Before Reaching of Notice Set Value)]

Figure 18:
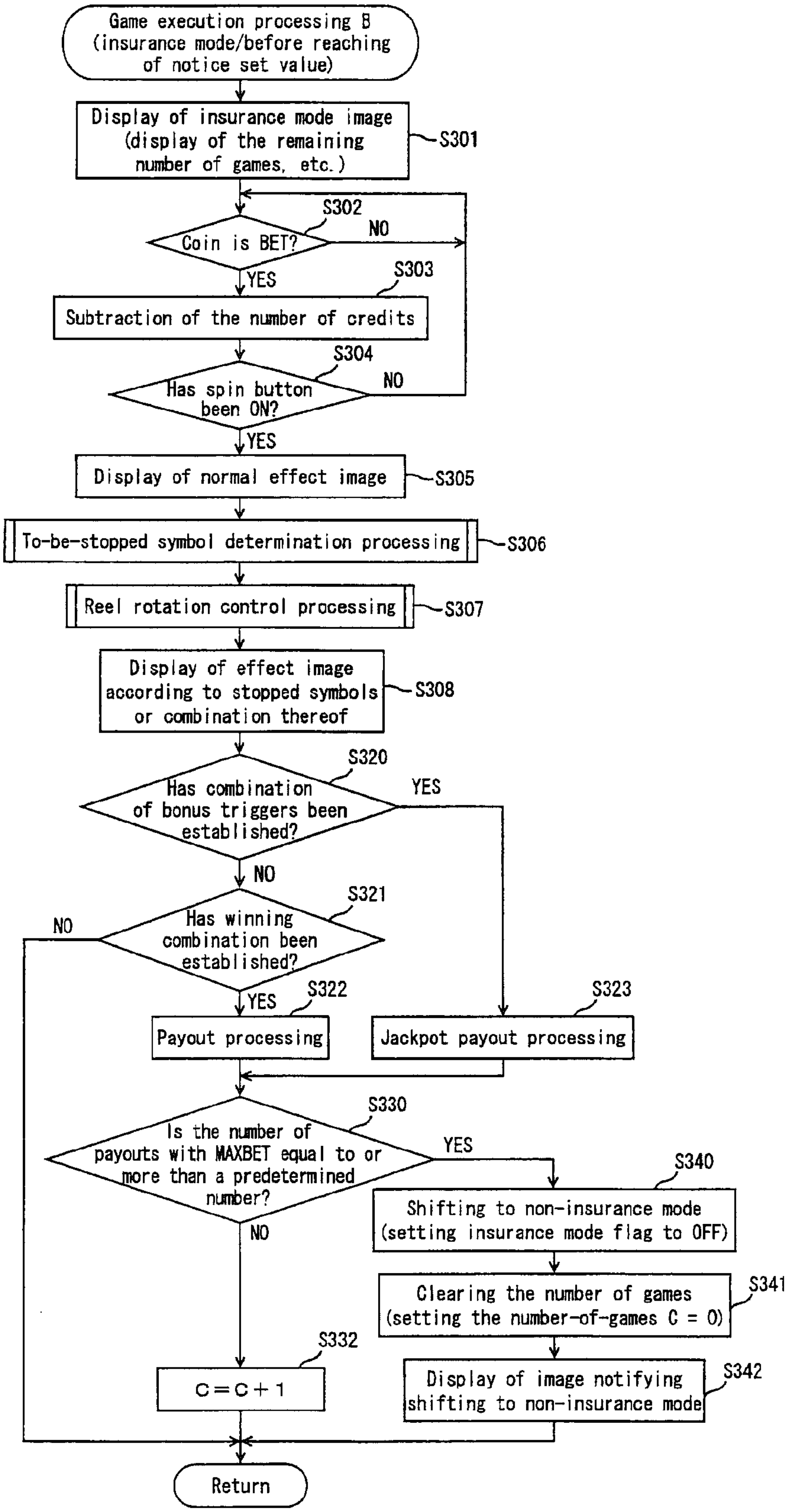
FIG. 18 is a flowchart showing a subroutine of game execution processing B (insurance mode/before reaching of notice set value).

FIG. 18 is a flowchart showing a subroutine of the game execution processing B which is called and executed in step S300 of the subroutine shown in FIG. 15.

First, the main CPU 41 conducts processing for displaying the insurance mode image (see [P03 in FIG. 5]) to the upper image display panel 33 and the lower image display panel 16 (step S301).

Subsequently, processing of steps S302 to S307 are conducted, and the processing are similar to the processing of steps S202 to S207 shown in FIG. 17.

Next, the main CPU 41 displays to the lower image display panel 16 an effect image (see [P04], [P05] in FIG. 5) according to rearranged symbols or a combination thereof (step S308).

Next, the main CPU 41 determines whether or not a combination of bonus triggers has been established (step S320), and when determining that the combination of bonus triggers has been established, the main CPU 41 conducts jackpot payout processing (step S323).

On the other hand, when determining that the combination of bonus triggers has not been established in step S320, the main CPU 41 determines whether or not a winning combination has been established (step S321). When determining that the winning combination has been established, the main CPU 41 pays out coins according to the number of BETs and the winning combination (step S322). When it is determined that any winning combination has not been established in step S321, the processing is shifted to step 330.

When executing the processing of step S322 or S323, the main CPU 41 determines whether or not the current game is a game with a MAXBET and the number of coin-outs in step S322 or step S323 is equal to or more than a predetermined number (180 in the present embodiment) (step S330).

In step S330, when determining that the current game is a game with a MAXBET and the number of coin-outs is not equal to or more than the predetermined number, the main CPU 41 increments the number-of-games C (C=C+1) stored in the RAM 43 (step S332), and ends the present subroutine.

In step S330, when determining that the current game is a game with a MAXBET and the number of coin-outs is equal to or more than the predetermined number (180), the main CPU 41 sets the insurance mode flag stored in the RAM 43 to "OFF", to shift the mode to the non-insurance mode (step S340).

Next, in the storage area of data showing the number-of-games C which is provided in the RAM 43, the main CPU 41 sets the number-of-games C to zero (C=0) so as to clear the number of games (step S341).

Subsequently, the main CPU 41 displays, to the lower image display panel 16, the image 98 (see [P22] in FIG. 13) showing that the mode has been shifted from the insurance mode to the non-insurance mode (step S342), and ends the present subroutine.

[Game Execution Processing C (Insurance Mode/after Reaching of Notice Set Value)]

Figure 19:
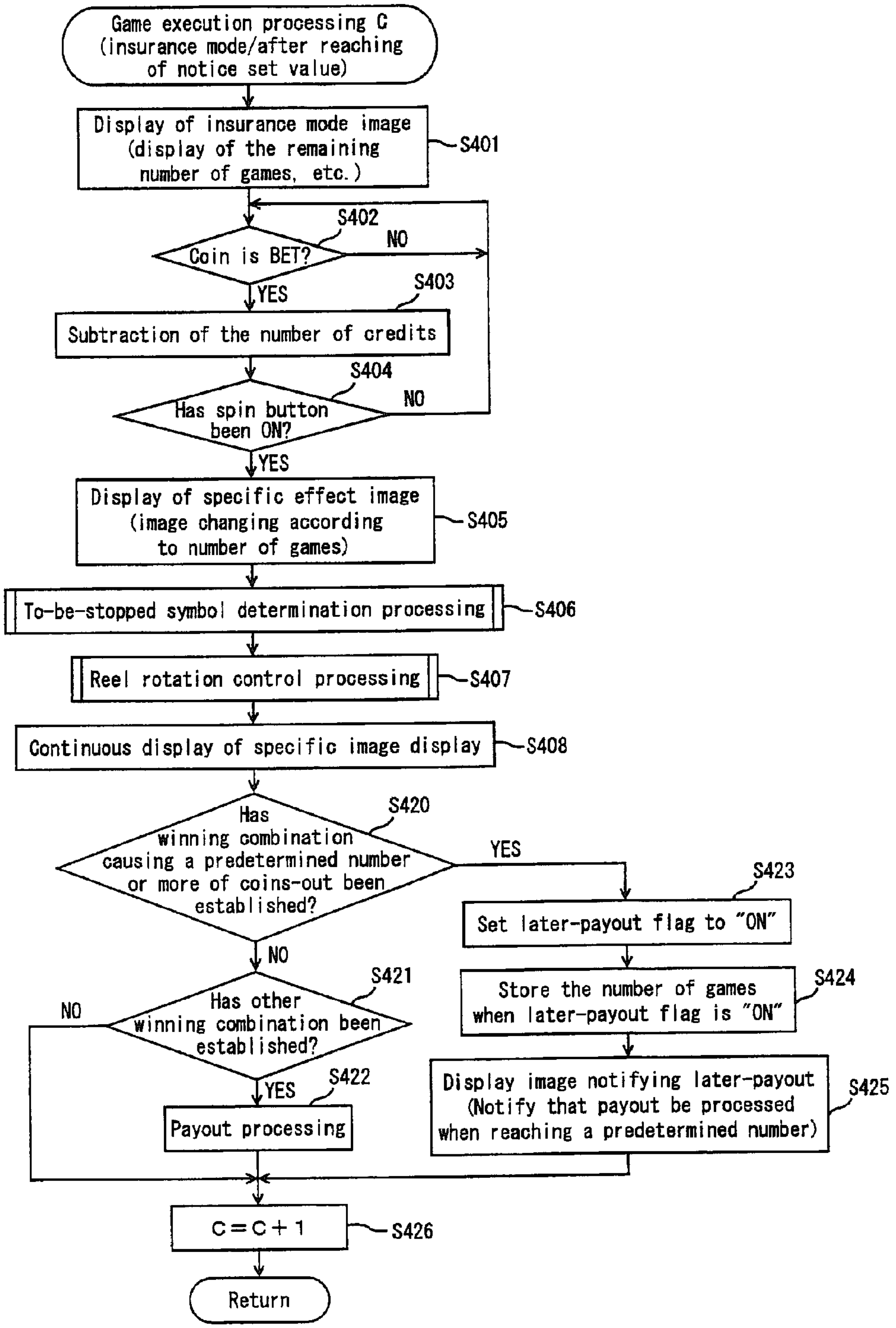
FIG. 19 is a flowchart showing a subroutine of game execution processing C (insurance mode/after reaching of notice set value).

FIG. 19 is a flowchart showing a subroutine of the game execution processing C which is called and executed in step S400 of the subroutine shown in FIG. 15.

First, the main CPU 41 conducts processing for displaying the insurance mode image to the upper image display panel 33 and the lower image display panel 16 (step S301).

Subsequently, processing of steps S402 to S404 are conducted, and the processing of those steps is similar to the processing of steps S202 to S204 shown in FIG. 17.

Next, the main CPU 41 displays specific effect images 95*a* to 95*i* (see [P06] to [P14] in FIGS. 6 to 9) to the lower image display panel 16 (step S405).

As described above, the specific effect image 95 is a video picture of an action of an angel as a character who appears and spreads her wings, and the specific effect images 95*a* to 95*j* are made by dividing the specific effect image 95 into a plurality of images along the time axis.

Therefore, with increase in number of games, the action of the angel as the character who appears and gradually spreads her wings is displayed by the specific effect image 95.

Subsequently, processing for steps S406 and S407 are performed, and the processing of these steps is similar to the processing of steps S206 and S207 shown in FIG. 17.

After the processing of step S407, the main CPU 41 conducts processing for continuously displaying the specific effect image 95 even after rotation of the reels 14 has been stopped (step S408).

It is to be noted that, in the processing shown in FIG. 19, when symbols or a combination thereof, accompanied by coin-outs, is established, the main CPU 41 does not display the effect image 94*e* which is displayed according to the symbols or the combination thereof as shown in [P19] (see FIG. 12). In place of that, the main CPU 41 displays the image 97*c* showing the number of coin-outs according to the symbols or the combination thereof while displaying the specific effect image 95 as shown in [P20] (see FIG. 12).

Next, the main CPU 41 determines whether or not a winning combination causing the number of coin-outs equal to or more than a predetermined number (180, in the present embodiment) has been established (step S240). When the main CPU 41 determines that a winning combination causing the number of coin-outs equal to or more than the predetermined number has been established, then the main CPU 41 sets a later-payout flag to "ON" (step S423). The later-payout flag is a flag indicating that a combination causing the number of coin-outs equal to or more than the predetermined number was established after the number of games reached the notice set value and also indicating the type of this combination.

Next, in step S424, the main CPU 41 stores the number of games at the timing when the later-payout flag was set to "ON".

Next, in step S425, the main CPU 41 displays an image notifying the later payout (see [P23] in FIG. 14) to the lower image display panel 16 and shifts the processing to step S426.

When the main CPU 41 determines in step S420 that the winning combination causing the number of coin-outs equal to or more than the predetermined number has not been established, then the main CPU 41 determines whether or not another winning combination has been established (step S421). When the main CPU 41 determines that another winning combination has been established, then the main CPU 41 pays out a number of coins corresponding to the established winning combination (step S422) and shifts the processing to step S426. On the other hand, when the main CPU 41 determines that no other winning combination has been established, then the main CPU 41 shifts the processing to step S426.

In step S426, the main CPU 41 increments the number C (C=C+1) of games stored in the RAM 43 (step S426) and then ends the present subroutine.

[Game Execution Processing D (Insurance Mode/at Reaching of Specific Number)]

Figure 20:
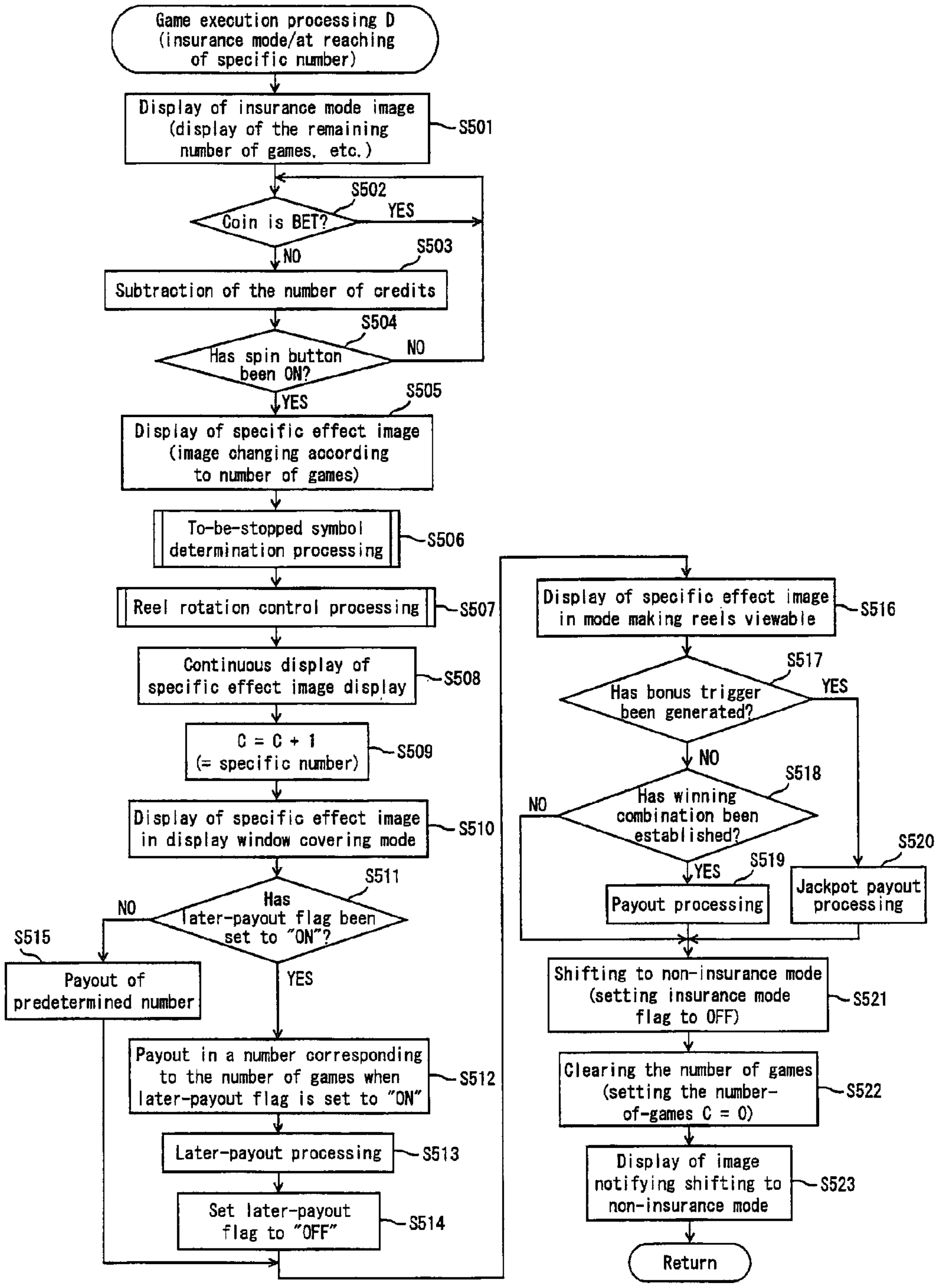
FIG. 20 is a flowchart showing a subroutine of game execution processing D (insurance mode/at reaching of a specific number).

FIG. 20 is a flowchart showing a subroutine of the game execution processing D which is called and executed in step S500 of the subroutine shown in FIG. 15.

First, the main CPU 41 conducts processing for displaying the insurance mode image to the upper image display panel 33 and the lower image display panel 16 (step S501).

Subsequently, processing of steps S502 to S504 are conducted, and the processing of these steps is similar to the processing of steps S202 to S204 shown in FIG. 17.

Next, the main CPU 41 displays a specific effect image 95*j* (see [P15] in FIG. 10) to the lower image display panel 16 (step S505).

The specific effect image 95*j* has contents continued from the specific effect images 95*a* to 95*i*, and displays an action of the angel as the character having spread her wings.

Subsequently, processing of steps S506 to S508 is conducted, and the processing of these steps is similar to the processing of steps S206 to S208 shown in FIG. 17.

After the processing of step S507, the main CPU 41 conducts processing for continuously displaying the specific effect image 95*j* even after rotation of the reels 14 has stopped (step S508).

It is to be noted that in the processing shown in FIG. 20, as in FIG. 19, when symbols or a combination thereof, accompanied by coin-outs (the symbols or a combination thereof with which the number of coin-outs reaches less than the predetermined number), is established, the main CPU 41 displays the image 97*c* showing the number of coin-outs according to the symbols or the combination thereof while displaying the specific effect image 95 as shown in [P20] (see FIG. 12).

Next, the main CPU 41 increments the number-of-games C (=999) (step S509) stored in the RAM 43. Thereby, the number-of-games C reaches the specific number 1000.

Next, the main CPU 41 displays an image shown in [P16] to the upper image display panel 33 and the lower image display panel 16 (step S510).

Namely, the image 97*a* is displayed to the upper image display panel 33, the image 97*a* showing that coins are being paid out based on that the number of games in the insurance mode has reached a specific number, and the similar image 97*b* is also displayed to the lower left side of the lower image display panel 16.

Moreover, the specific effect image 95*h* with contents continued from the specific effect images 95*a* to 95*j* is displayed to the lower image display panel 16. Furthermore, the specific effect image 95*h*' is displayed in the display windows 15 (15L, 15C, 15R).

Next, the main CPU 41 determines whether or not the later-payout flag is "ON" (step S511). When the main CPU 41 determines that the later-payout flag is not "ON", the main CPU 41 pays out a predetermined number of coins (360 coins, in the present embodiment) while displaying the image illustrated in [P16] (step S515).

When the main CPU 41 determines in step S511 that the later-payout flag is "ON", the main CPU 41 pays out coins in a number corresponding to the number of games at the timing when the later-payout flag was set to "ON" (step S512). More specifically, when the number of games at the timing when the later-payout flag was set to "ON" was 990, 300 coins are paid out. When the number of games at the timing was 991, 270 coins are paid out. When the number of games at the timing is 992, 240 coins are paid out. When the number of games at the timing was 993, 210 coins are paid out. When the number of games at the timing was 994, 180 coins are paid out. When the number of games at the timing was 995, 150 coins are paid out. When the number of games at the timing was 996, 120 coins are paid out. When the number of games at the timing was 997, 90 coins are paid out. When the number of games at the timing was 998, 60 coins are paid out. When the number of games at the timing was 999, 30 coins are paid out.

Next, the main CPU 41 pays out coins in a number corresponding to the winning combination indicated by the later-payout flag (step S514) and then sets the later-payout flag to "OFF".

After the processing of step S514 or step S515, the main CPU 41 stops display of the specific effect image 95*h*' in the display windows 15 while displaying the specific effect image 95*h* to the lower image display panel 16 so as to display the specific effect image 95 in such a manner as to make the reels 14 visible (step S516).

Next, the main CPU 41 determines whether or not the combination of bonus triggers has been established (step S517), and when determining that the combination of bonus triggers has been established, the main CPU 41 conducts a jackpot payout processing (step S520).

On the other hand, in step S517, when determining that the combination of bonus triggers has not been established, the main CPU 41 determines whether or not a winning combination has been established (step S518), and when determining that the winning combination has been established, the main CPU 41 pays out coins according to the number of BETs and winning combination (step S519).

When it is determined in the step S518 that the winning combination has not been established, or when the processing of the step S519 or S520 is executed, the main CPU 41 sets the insurance mode flag stored in the RAM 43 to "OFF" so as to shift to the non-insurance mode (S521).

Next, in the storage area of the data indicating the number-of-games C provided in the RAM 43, the main CPU 41 sets the number-of-games C to zero (C=0) so as to clear the number of games (step S522).

Subsequently, the main CPU 41 displays, to the lower image display panel 16, the image 98 (see [P18] in FIG. 11) showing that the mode has been shifted from the insurance mode to the non-insurance mode (step S523), and sets the insurance mode flag to "OFF" (step S521). Thereafter, the present subroutine is terminated.

Here, the payout processing in step S512, step S513, step S515, step S519 and step S520 are not necessarily conducted separately, and may be conducted in such a manner that the number to be paid out for each of the steps is accumulatively counted and then the accumulatively counted number of game media are paid out in one payout processing.

[Activation Processing]

FIG. 19 is a flowchart showing a procedure called and executed in step S101 of the flowchart shown in FIG. 15. This activation processing is the processing conducted by the mother board 40 and the gaming board 50. It should be noted that the memory card 53 is inserted into the card slot 53S in the gaming board 50, and the GAL 54 is mounted onto an IC socket 54S.

First, when a power switch is turned on (power is turned on) in the power supply unit 45, the mother board 40 and the gaming board 50 are activated (steps S1-1, S2-1). Inactivation of the mother board 40 and the gaming board 50, respective individual processing is executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3).

Since the ROM 55 of the gaming board 50 is connected to the main CPU 41 via the PCI bus, the main CPU 41 reads the authentication program stored in the ROM 55, and stores the read authentication program into the RAM 43 (steps S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, thereby execute the processing shown in FIG. 15.

[To-be-Stopped Symbol Determination Processing]

Figure 22:
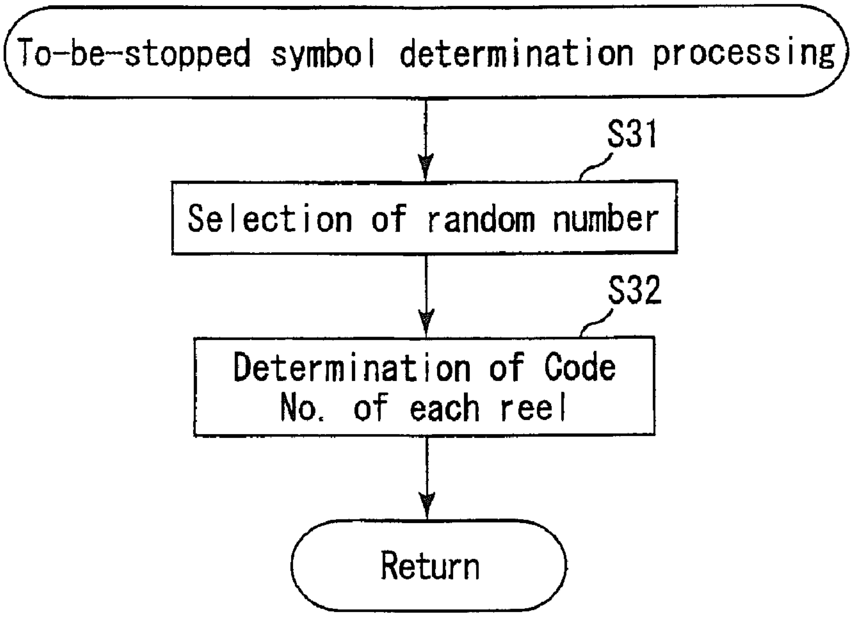
FIG. 22 is a flowchart showing a subroutine of to-be-stopped symbol determination processing.

FIG. 22 is a flowchart showing a subroutine of the to-be-stopped symbol determination processing called and executed in step S206 of the subroutine shown in FIG. 17. This is the processing conducted such that the main CPU 41 executes the to-be-stopped symbol determination program stored in the RAM 43.

First, the main CPU 41 executes a random number generation program included in the to-be-stopped symbol determination program, to select random numbers respectively corresponding to the three reels 14, out of the numbers falling in the numeric range of 0 to 255 (step S31). In the present embodiment, the case of generating random numbers on the program (the case of using a so-called software random number) is described. However, in the present invention, a random number generator may be provided and random numbers may be extracted from the random number generator (a so-called hardware random number may be used).

Next, the main CPU 41 (arithmetic processing unit) determines a code No. (see FIG. 25) of the respective reels 14 based on the selected three random numbers, by referring to symbol weighing data according to the payout ratio setting data outputted from GAL 54 and stored in the RAM 43 (storage device) (step S32). The code Nos. of the respective reels 14 correspond to code Nos. of symbols to be rearranged along the winning line L. It should be noted that later-described reel rotation control processing is conducted based on these code Nos. of the reels.

[Reel Rotation Control Processing]

Figure 23:
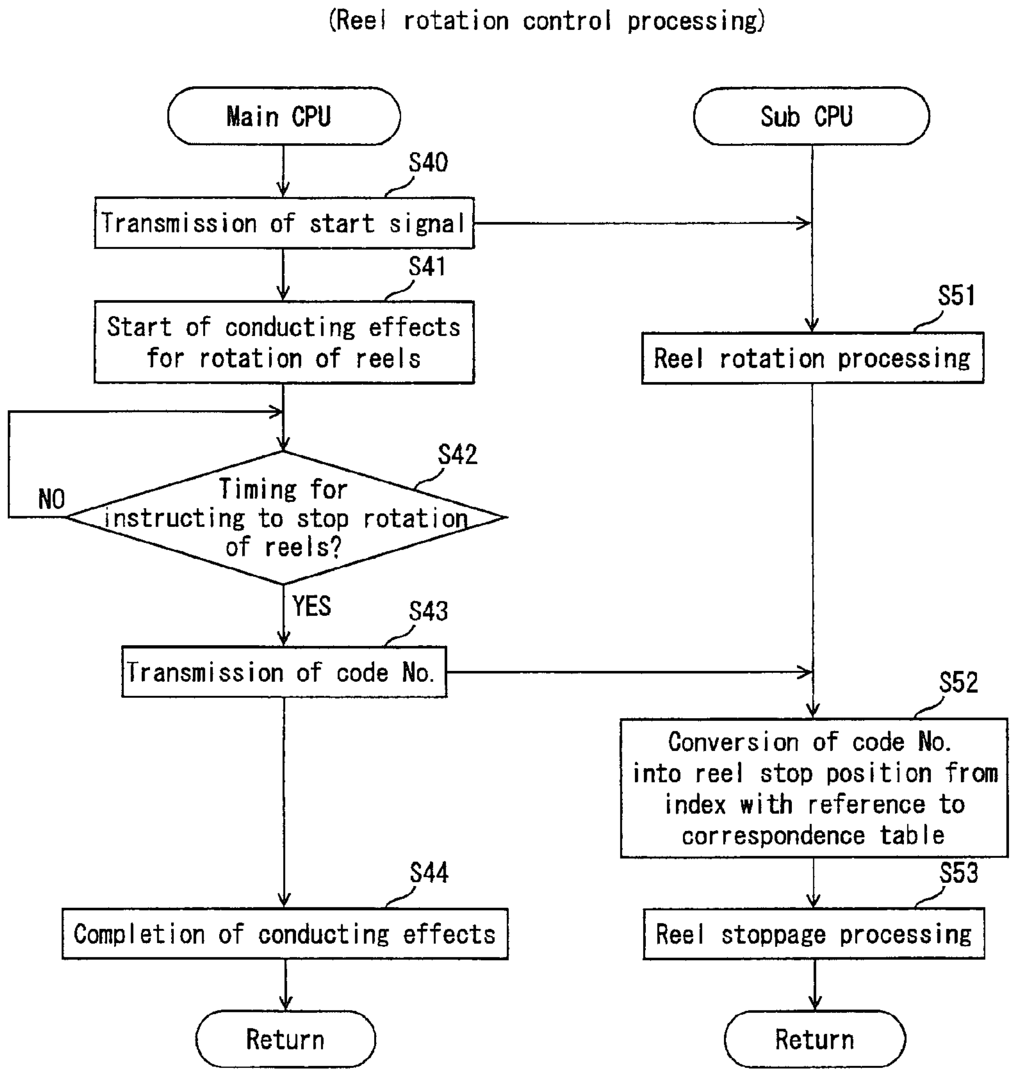
FIG. 23 is a flowchart showing a subroutine of reel rotation control processing.

FIG. 23 is a flowchart showing the reel rotation control processing called and executed in step S207 of the subroutine shown in FIG. 17. It is to be noted that this is the processing conducted between the main CPU 41 and the sub CPU 61.

First, the main CPU 41 transmits to the sub CPU 61*a* start signal to start rotation of the reels (step S40). Upon receipt of the start signal from the main CPU 41, the sub CPU 61 conducts the reel rotation processing (step S51). In this processing, the sub CPU 61 supplies a pulse to the motor driving circuit 62. The pulse outputted from the sub CPU 61 is amplified by the driver 64, and then supplied to each of the stepping motors 70 (70L, 70C, 70R). This results in rotation of each of the stepping motors 70, along with which each of the reels 14 (14L, 14C, 14R) is rotated. In the one-two phase excitation stepping motor 70, a step angle is 0.9 degrees and the number of steps per rotation is 400. Therefore, when 400 pulses are supplied to the stepping motor 70, the reel 14 rotates one turn.

In starting rotation of the reels 14, the sub CPU 61 supplies a low frequency pulse to the motor driving circuit 62, and gradually increases the pulse frequency. Along with this, a rotational speed of the reels 14 increases. After a lapse of a predetermined period of time, the pulse frequency is made constant. This results in rotation of the reel 14 at a constant speed.

Here, the rotational operation of the reel 14 is described by using FIGS. 24A to 24D.

FIGS. 24A to 24D are side views for explaining the rotational operation of the reel 14.

Figure 24A:
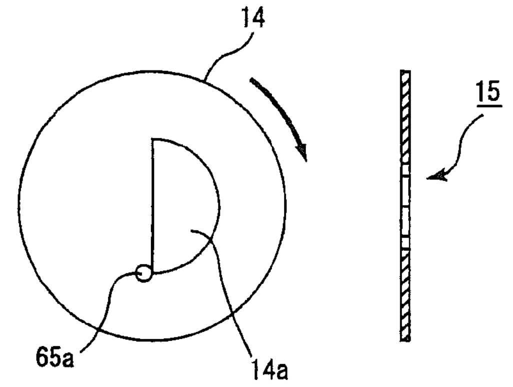
FIGS. 24A to 24D are side views for explaining the reel rotating operation.

As shown in FIG. 24A, a semicircular metal plate 14*a* is provided on the side face of the reel 14. The metal plate 14*a* is rotated along with the reel 14. Further, 22 symbols are provided on the peripheral face of the reel 14. Three symbols out of the 22 symbols drawn on the peripheral face of the reel 14 become visually identifiable via the display window 15 formed in front of the reel 14. In the figure, heavy-line arrows indicate the rotational direction of the reel 14. Further, an adjacent sensor 65*a* is provided on the side face of the reel 14. The adjacent sensor 65*a* is for detecting the metal plate 14*a*. The adjacent sensor 65*a* does not move or rotate along with rotation of the reel 14.

Figure 24B:
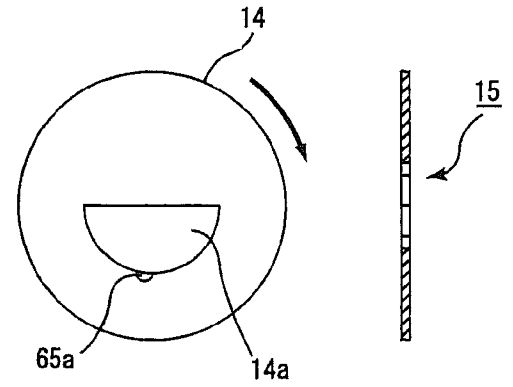
Figure 24C:
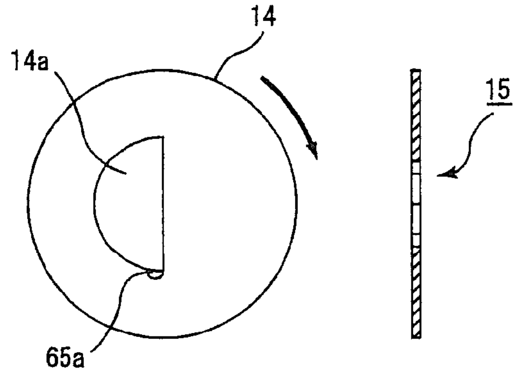

FIG. 24A shows a position (hereinafter also referred to as position A) of the metal plate 14*a* at the time point when the adjacent sensor 65*a* starts detecting the metal plate 14*a*. When the reel 14 rotates with the metal plate 14*a* located in the position A, the metal plate 14*a* moves to a position shown in FIG. 24B. FIG. 24B shows a position (hereinafter also referred to as position B) of the metal plate 14*a* when the adjacent sensor 65*a* is detecting the metal plate 14*a*. When the reel 14 rotates with the metal plate 14*a* located in the position B, the metal plate 14*a* moves to a position shown in FIG. 24C. FIG. 24C shows a position (hereinafter also referred to as position C) of the metal plate 14*a* at the time point when the adjacent sensor 65*a* stops detecting the metal plate 14*a*.

Figure 24D:
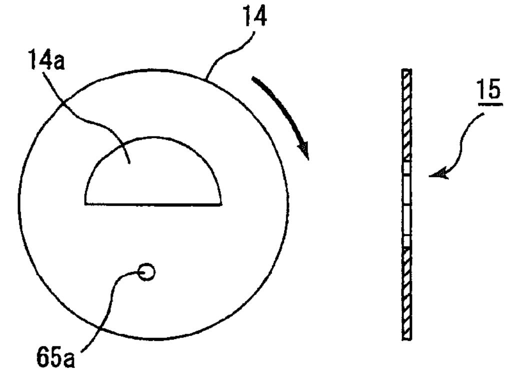

When the reel 14 rotates with the metal plate 14*a* located in the position C, the metal plate 14*a* moves to a position shown in FIG. 24D. FIG. 24D shows a position (hereinafter also referred to as position D) of the metal plate 14*a* when the adjacent sensor 65*a* is not detecting the metal plate 14*a*. When the reel 14 rotates with the metal plate 14*a* located in the position D, the metal plate 14*a* returns to the position A. As thus described, the position of the metal plate 14*a* changes sequentially from the position A, the position B, the position C, the position D, the position A, and so forth, along with rotation of the reel 14.

The adjacent sensor 65*a* constitutes the index detecting circuit 65 (see FIG. 2). Assuming that the state where the adjacent sensor 65*a* is detecting the metal plate 14*a* is referred to as "High" and the state where the adjacent sensor 65*a* is not detecting the metal plate 14*a* is referred to as "Low", the index detecting circuit 65 is in the "High" state when the metal plate 14*a* is located in the position A→the position B→the position C, and the index detecting circuit 65 is in the "Low" state when the metal plate 14*a* is located in the position C→the position D→the position A. It is to be noted that the sub CPU 61 identifies the rotational position of the reel 14 such that a leading edge from "Low" to "High" as index (original point) 1 and a falling edge from "High" to "Low" as index (original point) 2.

After transmitting a start signal to the sub CPU 61 in step S40, the main CPU 41 executes effects in rotation of the reels (step S41). This is the processing for displaying an image to the lower image display panel 16, outputting sound from the speaker 29, and the like, during a period (e.g. 3 seconds) set according to a result of the to-be-stopped symbol determination processing (FIG. 17, step S206) or the like.

Next, the main CPU 41 determines whether or not the current time point is the timing for instructing to stop rotation of the reels 14 (step S42).

Here, the timing for instructing to stop rotation of the reels 14 is the timing before the time point of stopping the performance of effects in rotation of the reels only by the minimum time required for stopping rotation of the reels 14. It is to be noted that the minimum time required for stopping rotation of the reels 14 is previously set.

In step S42, when determining that the current time point is not the timing for instructing to stop rotation of the reels 14, the main CPU 41 returns the processing to step S42, and continuously executes the performance of effects in rotation of the reels. On the other hand, when determining that the current time point is the timing for instructing to stop rotation of the reels 14 in step S42, the main CPU 41 transmits code No. stored in the RAM 43 to the sub CPU 61 (step S43). Upon receipt of code No. of the reels from the main CPU 41, the sub CPU 61 converts code No. into the stop position (the number of steps) of each reel from the index, based on the correspondence table of the number of steps stored in ROM (not shown) comprised in CPU 61 and code No. (step S52).

FIG. 25 is a schematic view showing a correspondence table of the number of steps and code No. Each code No. is corresponded to index and the number of steps.

It should be noted that each code No. corresponds to a symbol drawn on the peripheral face of the reel 14. Symbols of code No. "00" to "10" correspond to index 1. Symbols of code No. "11" to "21" correspond to index 2. Further, the numbers of steps in the correspondence table shown in FIG. 25 are the numbers of steps set with index 1 as a reference. For example, when code No. is "08", a position 145 steps from index 1 is the stop position of the reel. Further, when code No. is "12", a position 218 steps from index 1 is the stop position of the reel.

Next, the sub CPU 61 executes a reel stoppage processing (step S53). In this processing, the sub CPU 61 detects the leading edge (index 1) from "Low" to "High" of each reel 14 in the index detecting circuit 65, and supplies the index detecting circuit 65 with pulses corresponding to the number of steps into which code No. has been converted in step S52, at the timing of detecting index 1, and thereafter, the supply of the pulse is stopped.

For example, when it is determined that the stop position of the reel is a position 145 steps from index 1 in step S52, the sub CPU 61 supplies the index detecting circuit 65 with 145 pulses at the timing of detecting index 1, and then stops the supply of the pulse. Further, in step S52, when it is determined that the stop position of the reel is a position 218 steps from index 1, the sub CPU 61 supplies the index detecting circuit 65 with 218 pulses at the timing of detecting index 1. As a result, the reels 14 stop with the code numbers as determined in step S32 in FIG. 22, and a combination of symbols corresponding to the winning combination determined in step S32 in FIG. 22 is rearranged along the winning line L. Meanwhile, the main CPU 41 ends the performance of effects in rotation of the reels. After completing the processing of steps S44 and S53, the present processing is terminated.

It is to be noted that, when index corresponding to code No. transmitted in step S43 differs from index detected by the index detecting circuit 65 in stopping rotation of the reels 14, a loss of synchronism has occurred in the reels 14, and therefore, the main CPU 41 conducts processing for displaying an error message to the lower image display panel 16, or the like, to discontinue the game.

For example, when the index 1 is detected by the index detecting circuit 65 in stopping rotation of the reels 14 although the main CPU 41 conducts the processing for stopping reels 14 at code No. 12 which is corresponding to index 2, the game is discontinued.

As described above, according to the slot machine 10, the mode is shifted from the non-insurance mode to the insurance mode on condition that one coin has been inserted, and in the insurance mode, the number of games played after shifting to the insurance mode is counted. When the number of games counted reaches 1000, 360 coins are paid out (return).

Further, the main CPU 41 determines whether or not a winning combination causing coin-outs in a number equal to or more than a predetermined number (180, in the present embodiment) has been established during games which are executed from after the number of games reaches 990 (an advance notice set value) which is smaller by a predetermined value (10) than 1000 (the predetermined number), until the number of games reaches 1000. When the main CPU 41 determines that the winning combination causing coin-outs in a number equal to or more than the predetermined number has been established, the main CPU 41 pays out coins based on this winning combination at the timing of payout of the return.

Accordingly, no payout is performed on the basis of the winning combinations causing payout of coins in a number equal to or more than the predetermined number during the period from when the number of games reached 990 until it reaches 1000, namely the time period during which the player is highly interested in the return. This can prevent the player from losing the interest in the return halfway therethrough. Further, the payout based on this winning combination is performed at the timing when the return is processed, providing significant excitement for the player.

In the present embodiment, there has been described a case where the predetermined combination of bonus triggers according to the present invention is a winning combination causing coin-outs in a number equal to or more than a predetermined number. However, the predetermined bonus according to the present invention is not limited to the case, but may be, for example, a free game which can be played a predetermined number of times without betting coins thereon or may be a mystery bonus.

In the present embodiment, there has been described a case where the number of coins to be paid out as a return is smaller as the number of games, in which a combination of bonus triggers is established, approaches 1000. However, the present invention is not limited to this example, and it is also possible that the number of game media to be paid out is larger as the number of games, in which a combination of bonus triggers is established, approaches to a specific number.

There has been described a case where a single winning line L is provided in the present embodiment, however, in the present invention, it is possible that only a predetermined winning line (insurance line) is set as an object for counting the number of games, and the number of games is counted depending on whether or not a predetermined combination of symbols has been established along this insurance line.

While, in the present embodiment, there has been described a case where the image 98 (image indicating that the mode has been shifted to the non-insurance) is displayed to the lower image display panel 16, the present invention is not limited to the case. In the present invention, for example, it is possible that a sound output device (for example, speaker 29) outputs a sound indicating that the mode has been shifted to the non-insurance mode. Also, it is possible to display an image indicating that the mode has been shifted to the non-insurance mode, while outputting a sound indicating that the mode has been shifted to the non-insurance mode.

The slot machine 10 according to the present embodiment is a stand-alone type slot machine counting the number of games. However, in the present invention, the slot machine is not necessarily a stand-alone type slot machine, and a server connected to a plurality of slot machines via a network may count the number of games played in each slot machine.

Figure 26:
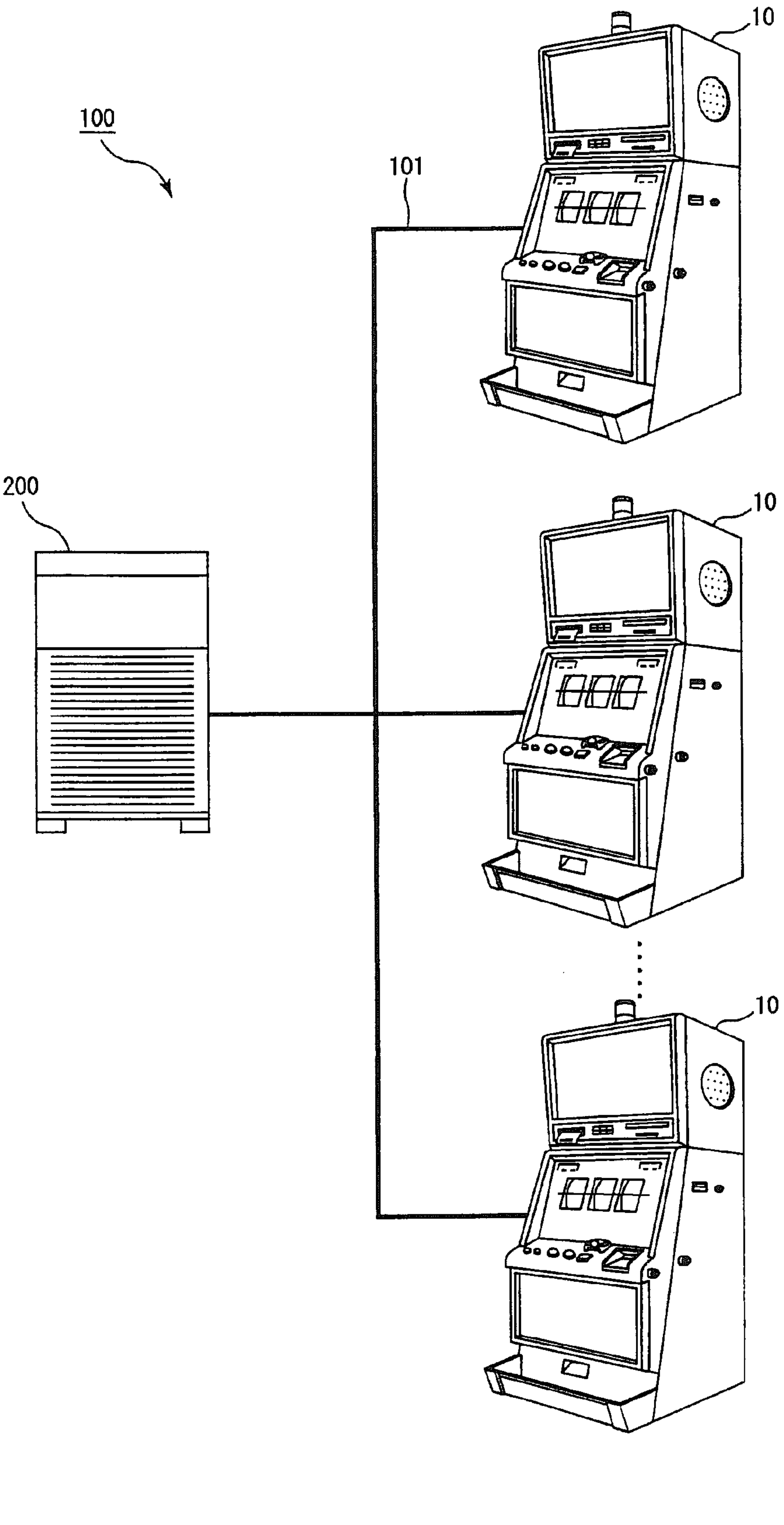
FIG. 26 is a schematic view showing an entire configuration of a game system according to one embodiment of the present invention.

FIG. 26 is a schematic view showing an entire configuration of a game system according to one embodiment of the present invention.

A game system 100 comprises a plurality of slot machines 10 and a server 200 connected with these slot machines 10 via a predetermined communication line 101. Such a game system 100 may be constructed inside one recreation facility where a variety of games can be played, such as a bar or a casino, or constructed among a plurality of recreation facilities. In the case of constructing the game system inside one recreation facility, the game system 100 may be constructed on each floor or in each section of the recreation facility. The communication line 101 is not particularly limited, and may be either wired or wireless, and an exclusive line, an exchange line or the like can be adopted.

The server 200 controls a plurality of slot machines 10. In the present embodiment, in particular, the server 200 conducts the processing for counting the number of games played in each slot machine 10. The server 200 may have a function as a so-called hall server which is installed in a recreation facility having a plurality of slot machines 10, a server to control a plurality of recreation facilities in block, or the like. It is to be noted that each slot machine 10 is provided with a unique identification number, and the server 200 determines from which slot machine data is transmitted according to the identification number. Also when data is transmitted from the server 200 to the slot machine 10, the server 200 specifies to which slot machine the data will be transmitted, by using the identification number.

In the above-mentioned example, the case of using mechanical reels 14 has been described. However, in the present invention, symbols may be displayed to a display device such as a liquid crystal display device in place of the mechanical reels.

Figure 27:
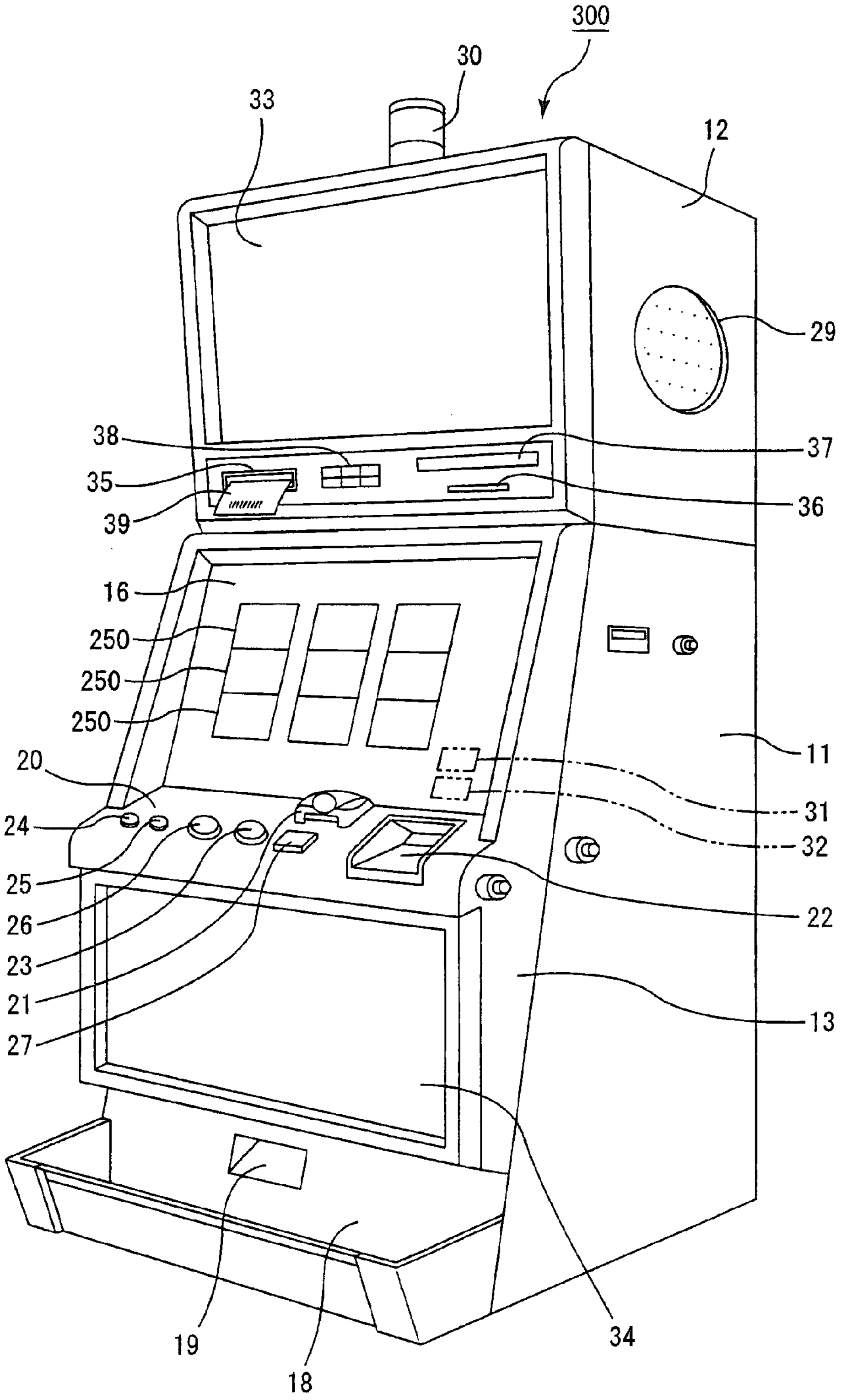
FIG. 27 is a perspective view schematically showing a slot machine according to another embodiment of the present invention.

FIG. 27 is a perspective view schematically showing a slot machine according to another embodiment of the present invention.

Except for displaying symbols to a lower image display panel, a slot machine 300 has substantially the same appearance, circuit configuration and the like as those of the slot machine 10, and the flowchart of the slot machine 300 is substantially the same as that of the slot machine 10. Therefore, descriptions of the slot machine 300 are omitted except for a description of symbol display. Further, constituents corresponding to those of the slot machine 10 are provided with the same numerals as in the slot machine 10.

The lower image display panel 16 included in the slot machine 300 is provided with symbol display areas 250 of three columns and three rows, and one symbol is displayed in each symbol display area. In such a configuration, the scroll-display of symbols may be displayed to the lower image display panel 16 in place of the reel rotation control by the sub CPU 61.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step becomes apparent from the above descriptions.

What is claimed as new and desired to be secured by Letters Patent of the United States is:

1. A slot machine comprising:

a symbol display device capable of rearranging a plurality of symbols;

an image display device capable of displaying an image; and a controller, said controller programmed to execute the processing of:

(A) executing a game in which said plurality of symbols are rearranged by said symbol display device after game media are BET in a number equal to or less than a previously set maximum number of BETs, and game media are paid out in a number according to the rearranged symbols or a combination thereof;

(B) shifting a mode from a non-insurance mode to an insurance mode on condition that a predetermined number of game media is inserted;

(C) counting the number of games played after shifting to said insurance mode, in said insurance mode;

(D) paying out a predetermined number of game media when the number of games counted in said processing (C) reaches a specific number;

(E) determining whether a symbol or a symbol combination with which a predetermined number or more of the game media is paid out has been established during games executed after the number of games counted in (C) reaches a notice set value, the notice set value being smaller than said specific number by a predetermined value until it is equal to said specific number;

(F) storing the number of games having been counted when said bonus symbol or symbol combination with which a predetermined number or more of the game media is paid out is established;

(G) when the number of games having been counted reaches the specific number after said processing (F), paying out game media based on said symbol or said combination determined to have been established in said processing (E), and at the same time, paying out game media based on the number of games stored in said processing (F);

(H) displaying a normal effect image to said image display device;

(I) displaying, when the number of games counted in (C) reaches a notice set value which is smaller than said specific number by the predetermined value, a specific effect image instead of said normal effect image to said image display device in subsequent games; and, (J) paying out the predetermined number or more of game media based on said symbol or said symbol combination and shifting a mode from the insurance mode to the non-insurance mode when said symbol or said symbol combination is established before the number of games counted in (C) reaches the notice set value.

2. The slot machine according to claim 1, wherein said controller is further programmed to conduct processing of:

(J) clearing the number of games counted in said processing (C), when said symbol or symbol combination is established before the number of games counted in said processing (C) reaches said notice set value.

3. The slot machine according to claim 1, wherein said controller is further programmed to pay out a smaller number of game media as the number of the game, in which the symbol or symbol combination is established, approaches to said specific number in said processing (D).

4. The slot machine according to claim 1, wherein said controller is further programmed to execute the processing of:

(J) displaying to said image display device information indicating that the game media based on said symbol or symbol combination are paid out when the number of games reaches said specific number, when said symbol or symbol combination is determined to be established in said processing (E).

5. A game control method configuring a slot machine comprising the steps of:

(A) executing a game in which a plurality of symbols are rearranged by a symbol display device capable of rearranging said plurality of symbols after game media are BET in a number equal to or less than a previously set maximum number of BETs, and game media are paid out in a number according to the rearranged symbols or a combination thereof;

(B) shifting a mode from a non-insurance mode to an insurance mode on condition that a predetermined number of game media is inserted;

(C) counting the number of games played after shifting to said insurance mode, in said insurance mode;

(D) paying out a predetermined number of game media when the number of games counted in said step (C) reaches a specific number;

(E) determining whether a symbol or a symbol combination with which a predetermined number or more of the game media is paid out has been established during games executed after the number of games counted in (C) reaches a notice set value, the notice set value being smaller than said specific number by a predetermined value until it is equal to said specific number;

(F) storing the number of games having been counted when said symbol or symbol combination with which a predetermined number or more of the game media is paid out is established;

(G) when the number of games having been counted reaches the specific number after said processing (F), paying out game media based on said symbol or said combination determined to have been established in said processing (E), and at the same time, paying out game media based on the number of games stored in said processing (F);

(H) displaying a normal effect image to an image display device; and (I) displaying, when the number of games counted in (C) reaches a notice set value which is smaller than said specific number by the predetermined value, a specific effect image instead of said normal effect image to said image display device in subsequent games; and, (J) paying out the predetermined number or more of game media based on said symbol or symbol combination and shifting a mode from the insurance mode to the non-insurance mode when said symbol or symbol combination is established before the number of games counted in (C) reaches the notice set value.

6. The slot machine according to claim 2, wherein said controller is further programmed to execute the processing of:

(K) displaying to said image display device information indicating that the game media based on said symbol or symbol combination are paid out when the number of games reaches said specific number, when said symbol or symbol combination is determined to be established in said processing (E).

7. The slot machine according to claim 3, wherein said controller is further programmed to execute the processing of:

(J) displaying to said image display device information indicating that the game media based on said symbol or symbol combination are paid out when the number of games reaches said specific number, when said symbol or symbol combination is determined to be established in said processing (E).

8. The slot machine according to claim 1, wherein in (F), paying out game media based on said symbol or symbol combination at the same time as the payout of game media of (D), when said symbol or symbol combination is determined to be established in said processing (E), comprises:

setting a flag/indicator to indicate establishment of said symbol or symbol combination when a determination of said symbol or symbol combination has been made;

determining whether said flag/indicator is established when the number of games counted in (C) reaches said specific number; and paying out game media based on said establishment of said symbol or symbol combination at the same time as the payout of game media based on reaching the number of games of said specific number when said flag/indicator is set.

9. The game control method of claim 5, wherein in (F), paying out game media based on said symbol or symbol combination at the same time as the payout of game media of (D), when said symbol or symbol combination is determined to be established in (E), comprises:

setting a flag/indicator to indicate establishment of said symbol or symbol combination when a determination of said symbol or symbol combination has been made;

determining whether said flag/indicator is established when the number of games counted in (C) reaches said specific number; and paying out game media based on said establishment of said symbol or symbol combination at the same time as the payout of game media based on reaching the number of games of said specific number when said flag/indicator is set.

10. The slot machine according to claim 1 wherein the predetermined value is greater than zero and less than the specific number.

11. The game control method of claim 5, wherein the predetermined value is greater than zero and less than the specific number.

* * * * *